(12) United States Patent
MacDonald et al.

(10) Patent No.: US 9,551,352 B2
(45) Date of Patent: Jan. 24, 2017

(54) TECHNIQUES FOR IMPROVED VOLUMETRIC RESISTANCE BLOWER APPARATUS, SYSTEM AND METHOD

(71) Applicant: Intel Corporation, Santa Clara, CA (US)

(72) Inventors: Mark MacDonald, Beaverton, OR (US); Douglas Heymann, Hillsboro, OR (US); Jered H. Wikander, Aloha, OR (US); Yoshifumi Nishi, Tsukuba (JP)

(73) Assignee: INTEL CORPORATION, Santa Clara, CA (US)

( * ) Notice: Subject to any disclaimer, the term of this patent is extended or adjusted under 35 U.S.C. 154(b) by 645 days.

(21) Appl. No.: 13/930,258

(22) Filed: Jun. 28, 2013

(65) Prior Publication Data

US 2015/0003007 A1   Jan. 1, 2015

(51) Int. Cl.
*F04D 29/38* (2006.01)
*F04D 29/28* (2006.01)
*F04D 29/66* (2006.01)
*G06F 1/20* (2006.01)
*F04D 29/22* (2006.01)
*F04D 29/30* (2006.01)
(Continued)

(52) U.S. Cl.
CPC .......... *F04D 29/281* (2013.01); *B21D 53/267* (2013.01); *F04D 17/04* (2013.01); *F04D 17/167* (2013.01); *F04D 25/0613* (2013.01); *F04D 29/2227* (2013.01); *F04D 29/30* (2013.01); *F04D 29/666* (2013.01); *G06F 1/203* (2013.01); *F05D 2250/191* (2013.01); *F05D 2300/514* (2013.01); *Y10T 29/49826* (2015.01)

(58) Field of Classification Search
CPC ...... F04D 19/02; F04D 29/181; F04D 29/183; F04D 29/2227; F04D 29/281; F04D 29/30; F04D 29/325; F04D 29/38; F04D 29/388; F04D 17/167; F04D 25/0613; F05D 2250/191; B21D 53/267
See application file for complete search history.

(56) References Cited

U.S. PATENT DOCUMENTS 579,081 A    3/1897  Rembert
2,831,630 A *  4/1958  Perry ................ F04D 29/281
                                                          29/889.4

(Continued)

FOREIGN PATENT DOCUMENTS

JP    2001041196    2/2001
TW    200813338    3/2008

(Continued)

OTHER PUBLICATIONS

International Search Report and Written Opinion received for PCT Patent Application No. PCT/US2014/043786, mailed Oct. 17, 2014, 11 pages.

(Continued)

*Primary Examiner* — Ninh H Nguyen

(57) ABSTRACT

Embodiments of an apparatus, system, method and techniques are described for an improved volumetric resistance blower and rotor. An apparatus may comprise, for example a motor, a casing having one or more inlets and one or more outlets, and a cylindrical rotor to create a volumetric resistance inside the casing, at least a portion of the rotor comprising a porous material. Other embodiments are described.

14 Claims, 23 Drawing Sheets

(51) Int. Cl.
*B21D 53/26* (2006.01)
*F04D 17/04* (2006.01)
*F04D 17/16* (2006.01)
*F04D 25/06* (2006.01)

(56) References Cited

U.S. PATENT DOCUMENTS

| | | | | |
|---|---|---|---|---|
| 2,841,289 | A * | 7/1958 | Odlum | B25H 3/003 |
| | | | | 211/70.6 |
| 3,414,188 | A * | 12/1968 | Gallie | F04D 29/281 |
| | | | | 415/105 |
| 4,902,196 | A * | 2/1990 | Byrd | F04D 17/167 |
| | | | | 415/141 |
| 5,257,902 | A * | 11/1993 | Atarashi | F04D 29/666 |
| | | | | 415/119 |
| 5,265,348 | A * | 11/1993 | Fleishman | A45D 20/12 |
| | | | | 15/300.1 |
| 7,086,837 | B2 * | 8/2006 | Kamoshita | F04D 29/666 |
| | | | | 416/181 |
| 7,455,504 | B2 * | 11/2008 | Hill | F04D 29/281 |
| | | | | 416/179 |
| 7,697,290 | B2 * | 4/2010 | Wu | G06F 1/20 |
| | | | | 165/104.33 |
| 8,075,276 | B2 * | 12/2011 | Hwang | F04D 29/023 |
| | | | | 416/229 R |
| 2002/0180285 | A1 | 12/2002 | Machiroutu | |
| 2008/0247134 | A1 | 10/2008 | Hwang et al. | |
| 2011/0159797 | A1 | 6/2011 | Beltman et al. | |
| 2012/0026677 | A1 | 2/2012 | Bhutani et al. | |

FOREIGN PATENT DOCUMENTS

| | | |
|---|---|---|
| TW | 201312010 | 3/2013 |
| WO | 2013085510 | 6/2013 |

OTHER PUBLICATIONS

Office Action and Search Report received for Taiwanese Patent Application No. 103119371, mailed Nov. 17, 2015, 17 pages including 9 pages English translation.

* cited by examiner

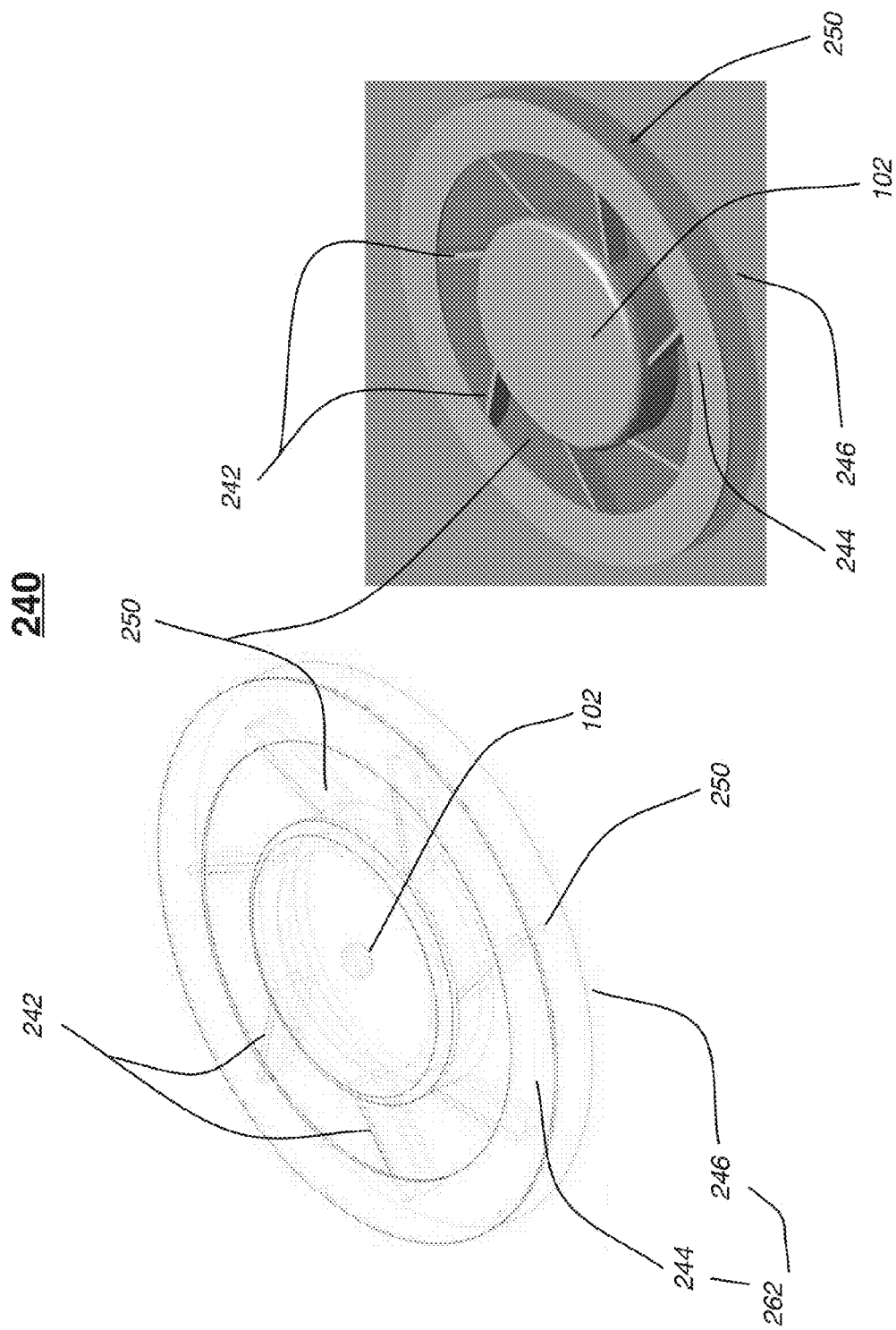

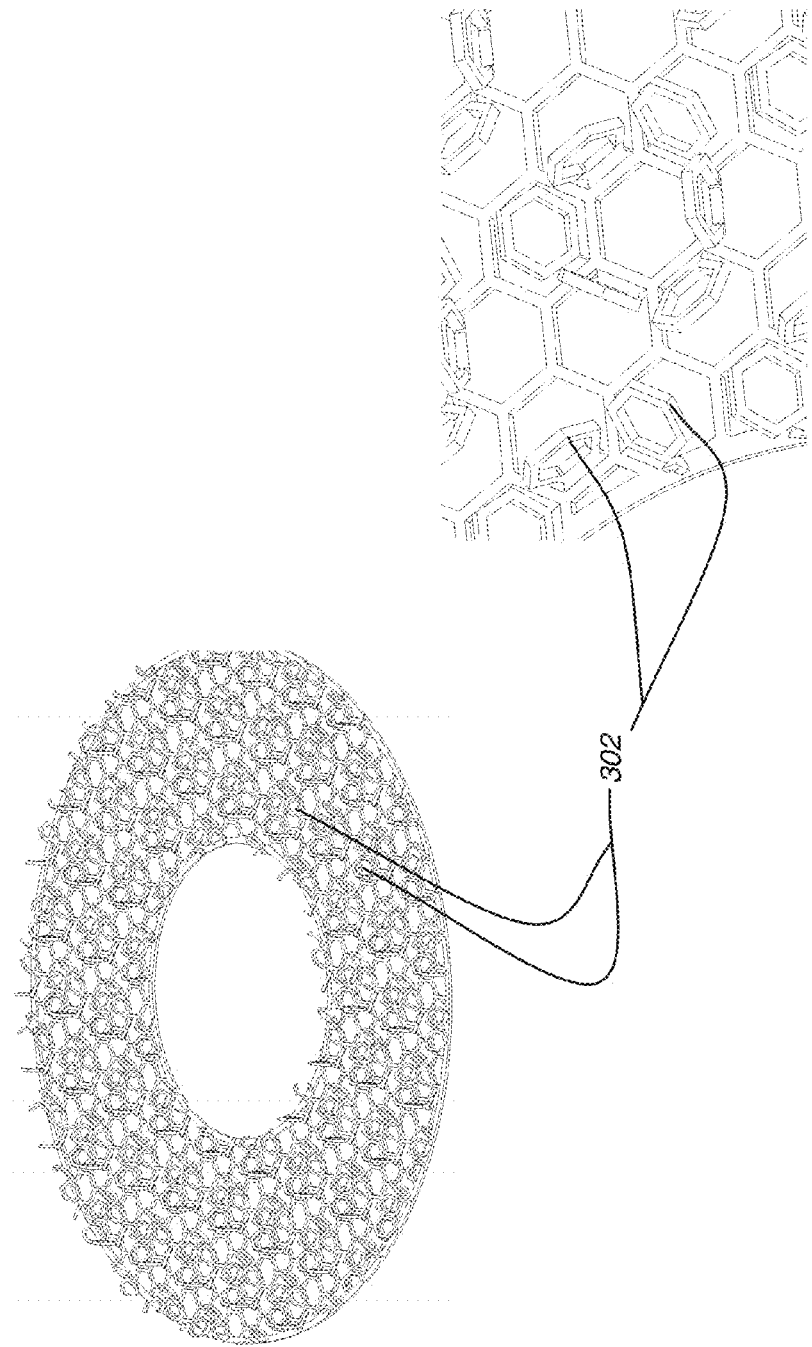

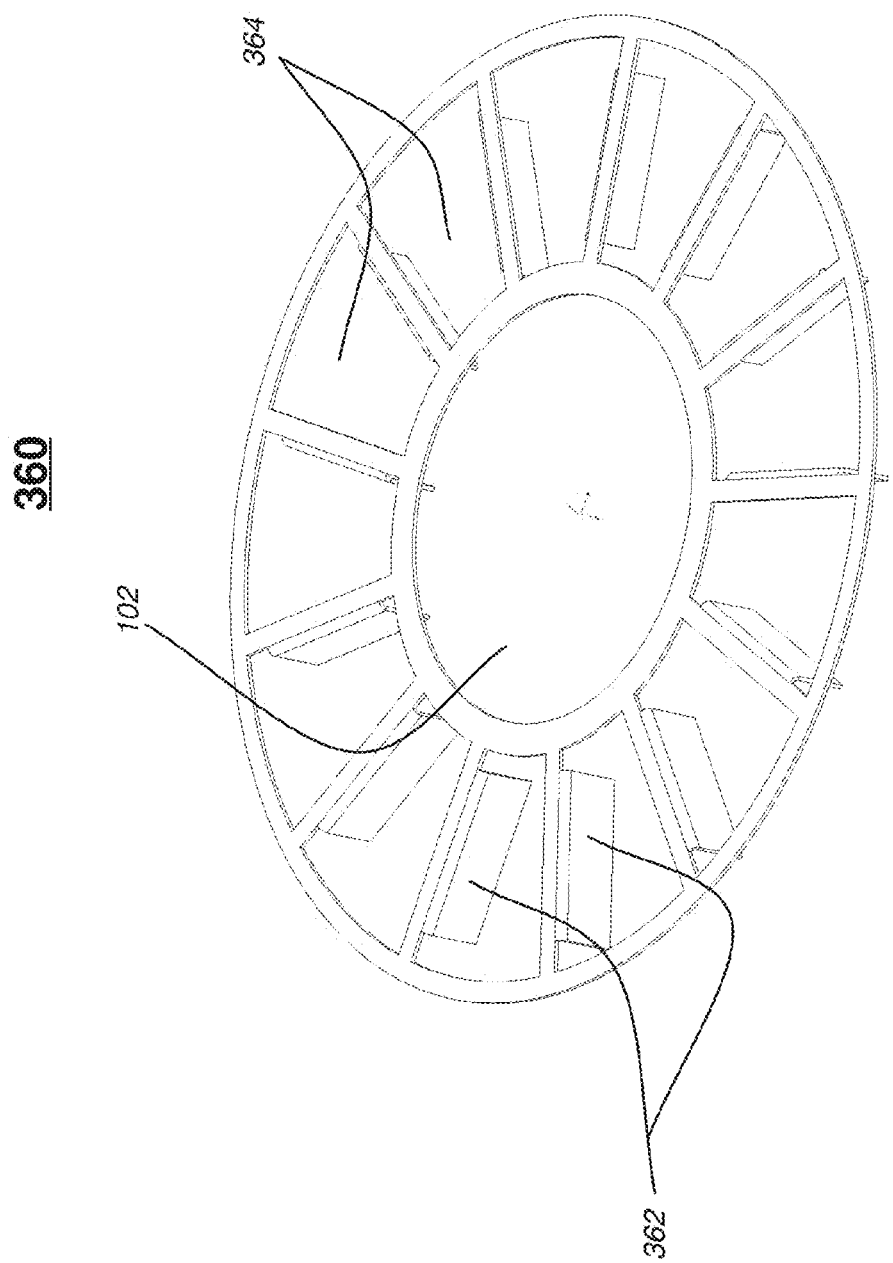

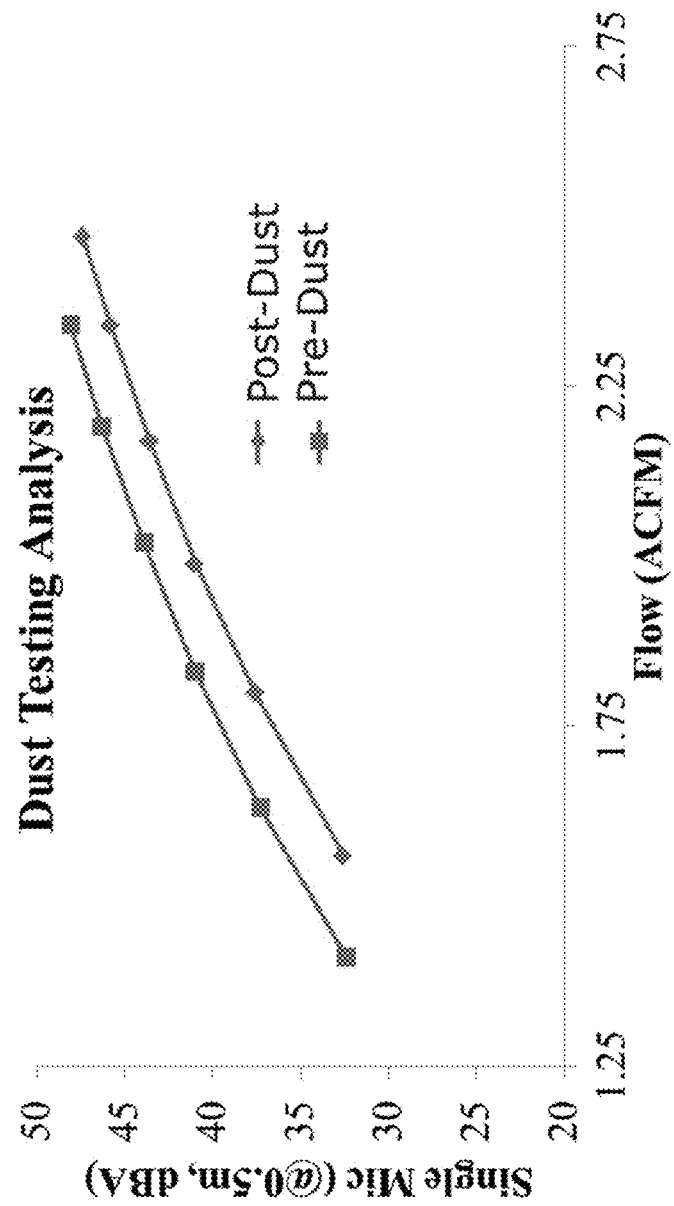

TECHNIQUES FOR IMPROVED VOLUMETRIC RESISTANCE BLOWER APPARATUS, SYSTEM AND METHOD

TECHNICAL FIELD

Embodiments described herein generally relate to techniques, apparatus, systems and methods for improved volumetric resistance blowers and rotors.

BACKGROUND

Modern computing systems generate heat during operation. The heat may affect certain platform components of a system and is therefore generally required to be dissipated or removed from the system. Heat generated by the computing system may be limited or reduced using various thermal management techniques and/or heat dissipation techniques. For example, heat generated by a processor may be dissipated by creating a flow of air using a fan or blower. Further, various platform-level cooling devices may be implemented in conjunction with the fan or blower to enhance heat dissipation, such as heat pipes, heat spreaders, heat sinks, vents, phase change materials or liquid-based coolants.

Traditional blowers used in portable computing systems may generate flows of air to remove or dissipate heat, but they also generate high levels of noise and occupy large amounts of space. This may be problematic in notebook computers, for example, because ergonomic acoustic limits may be low to ensure a satisfactory user experience and space within an enclosure is limited due to the ever-decreasing size of portable computing systems. Because of the ergonomic acoustic limits and other restrictions, the cooling capacity of traditional systems may be thermally limited because standard blowers may not be allowed to run at their maximum speed, resulting in reduced efficiency for the blower and reduced cooling capacity for the system. Additionally, the efficiency of traditional blowers that are scaled down in size to accommodate the limited space available within portable computing systems decreases resulted in a reduced cooling capacity for the system. Consequently, a need exists for improved cooling techniques for notebook computers.

BRIEF DESCRIPTION OF THE DRAWINGS

FIGS. 2B-2G illustrate embodiments of rotors.
FIG. 3A-3B illustrate embodiments of rotors.
FIG. 3D illustrates an embodiment of a rotor.
FIG. 5D illustrates embodiments of a graph.

DETAILED DESCRIPTION

Figure 1A:
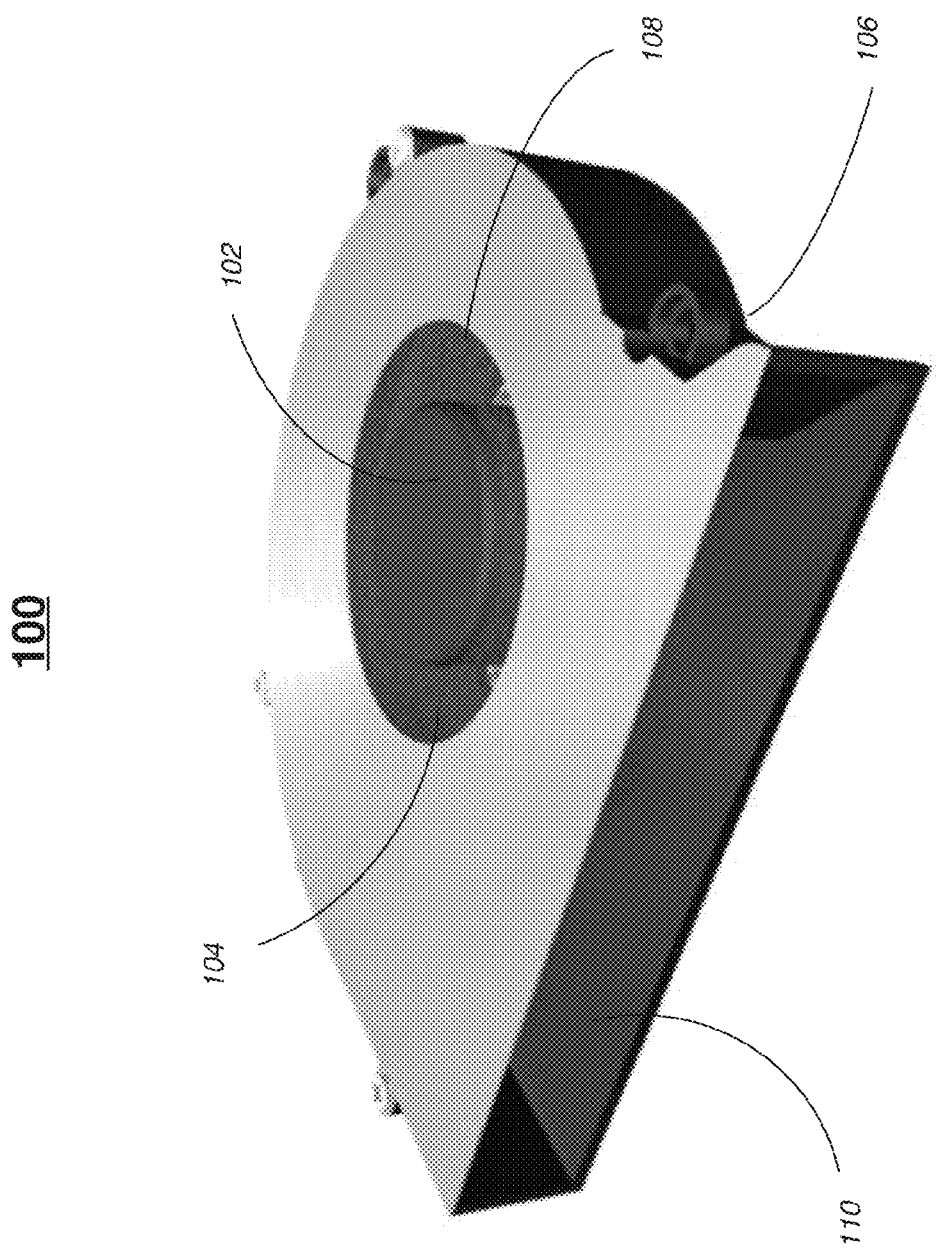
FIGS. 1A-1B illustrate embodiments of a blower.

The embodiments are generally directed to techniques designed to improve cooling in computing systems. Various embodiments provide techniques that include a volumetric resistance blower that includes a cylindrical rotor comprising a variety of configurations and materials wherein at least a portion of the rotor comprises a porous material. Replacing a traditional blade-based rotor with a cylindrical rotor including a porous material in a volumetric resistance blower may reduce blower acoustic levels at a given airflow and may increase the efficiency of the blower as the size or thickness of the rotor is decreased relative to a similar decrease in size or thickness for a blade-based rotor allowing for improved platform thermal performance under all workloads, improved cooling capabilities, increased system performance and improved acoustics. Other embodiments are described and claimed.

In various embodiments, traditional computing system blowers include a rotor having a plurality of exposed fins or blades. These blade-based rotors, while capable of moving air, generate an undesirable amount of noise (e.g. blade pass noise and the like) and occupy and undesirable amount of space within an enclosure of a computing system. Because of the amount of noise generated, system designers are often required to limit the speed at which traditional blowers are allowed to operate. For example, traditional blowers are often restricted from operating at their maximum speed because the noise generated by the blade-based rotors at this and other high speeds exceeds an established ergonomic acoustic limit (e.g., an allowable amount of noise generated by the system). Additionally, the efficiency of traditional blowers are often dependent upon the size of the rotor and the associated fins or blades, which necessitates a tradeoff for designers between increased cooling capacity and decreased form factor size. As a result of these and other considerations, other measures are often taken by the system to prevent overheating, such as processor throttling, which may be equally undesirable. Consequently, a need exists for improved techniques for computing system cooling.

Embodiments may include one or more elements. An element may comprise any structure arranged to perform certain operations. Each element may be implemented as hardware, software, or any combination thereof, as desired for a given set of design parameters or performance constraints. Although embodiments may be described with particular elements in certain arrangements by way of example, embodiments may include other combinations of elements in alternate arrangements.

It is worthy to note that any reference to "one embodiment" or "an embodiment" means that a particular feature, structure, or characteristic described in connection with the embodiment is included in at least one embodiment. The appearances of the phrases "in one embodiment" and "in an embodiment" in various places in the specification are not necessarily all referring to the same embodiment. The same is also true for the phrases "some embodiments" and "various embodiments."

In various embodiments, a plurality of blowers and rotors are described herein wherein at least a portion of each rotor may comprise or include a porous material or other arrangements to limit blade pass noise, broadband noise, and the like. While the embodiments described herein refer to certain arrangements of rotors within different casings and to different materials and arrangements for different embodiments of rotors, it should be understood that the casings may comprise any suitable configuration and the rotors may comprise or include any suitable porous material or other similar arrangement and still fall within the described embodiments. In some embodiments, the blower may comprise a case-less centrifugal fan that may be referred to as a radial or dish fan and may be the same or similar to other blowers described herein, but without the case. Reference is made herein to particular casing and rotor configurations for purposes of illustration and not limitation. As such, the embodiments are not limited in this respect.

FIG. 1A illustrates an apparatus 100. Apparatus 100 may comprise a volumetric resistance blower (VRB) 100 in some embodiments. As shown in FIG. 1A, VRB 100 may include a plurality of components, such as motor or hub 102, rotor 104, casing 106, inlet 108 and outlet 110. The embodiments are not limited to the number, type or arrangement of components shown in FIG. 1A. Various embodiments described herein refer to a dual-input, single output blower as shown in FIG. 1A. The embodiments are not limited in this context. One skilled in the art will appreciate that any suitable arrangement for VRB 100 could be used and still fall within the described embodiments including but not limited to the arrangements shown in FIGS. 1B, 1C, 2G, 3C, 4A, 4B, 4C, 5C, etc.

Motor and/or hub 102 may comprise any suitable electric motor, mechanically driven engine, heat engine or aerodynamically driven motor capable of rotating rotor 104 to create a flow of air in some embodiments and/or a hub or other support structure arranged to support rotor 104 and to couple the rotor 104 to the motor 102. In various embodiments, motor and/or hub 102 may comprise an AC motor, brushed DC motor or brushless DC motor. For example, motor 102 may comprise a DC motor powered by an internal or external power source of apparatus 100. The size and location of motor and/or hub 102 may be selected based on the size and performance constraints of a particular implementation of VRB 100.

Casing 106 may comprise a housing or enclosure arranged to mount or otherwise contain or stabilize motor and/or hub 102 and rotor 104 in some embodiments. In various embodiments, casing 106 may comprise a plastic or metal component configured with one or more inlets 108 and one or more outlets 110. For example, the casing 106 may include a top inlet 108, a bottom inlet (not shown) opposite the top inlet 108 and an outlet 110. In various embodiments, the inlets 108 may be arranged in an axial direction of the rotor 104 and the outlet 110 may be arranged in a radial direction of the rotor 104 although the embodiments are not limited in this context as described elsewhere herein. In various embodiments the casing may include more than one outlet to enable, for example, a dual outlet configuration. In some embodiments, the casing 106 may comprise a plastic component, such as an injection molded plastic component, that provides an inlet, outlet and flow management features for the VRB 100. While various embodiments described herein include a casing 106, it should be understood that some embodiments may comprise a case-less blower in which no surrounding case is used and airflow may exit through or about the rotor in a full 360 degrees. Other embodiments are described and claimed.

In various embodiments, VRB 100 includes rotor 104. Rotor 104 may be arranged to increase the pressure and/or flow of air for VRB 100 in some embodiments. Rotor 104 may be any size or shape suitable for inducing the flow of air. In some embodiments, rotor 104 may comprise a cylindrical rotor 104 wherein at least a portion of the rotor 104 comprises a porous material. For example, as described elsewhere herein, one or more portions of the rotor 104 may comprise or include foam, reticulated foam, fabric, layered fabric, unwoven fabric, cut or stamped metal or any other suitable porous media or material. In some embodiments, one or more different materials may be used to form the rotor 104 and still fall within the described embodiments. Various embodiments of rotor 104 are described in more detail with reference to FIGS. 1B-1C, 2A-2G, 3A-3B and 3D.

Figure 1B:
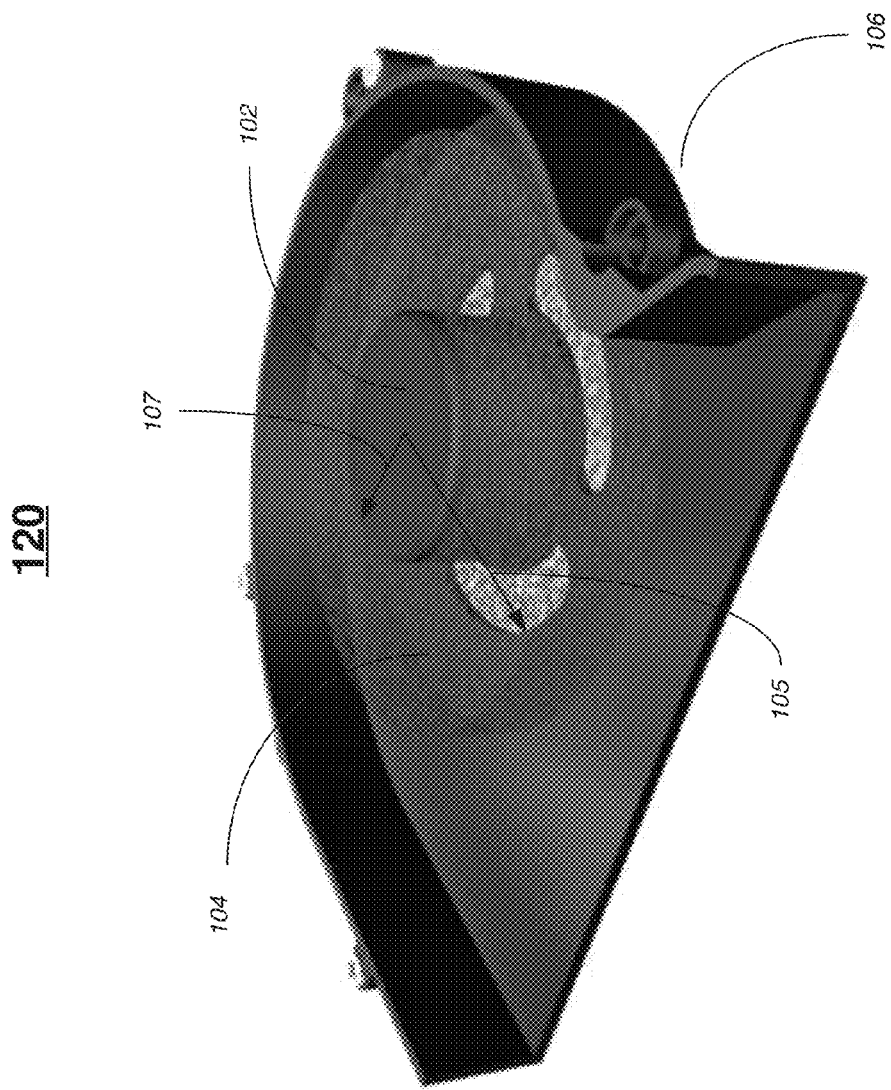

FIG. 1B illustrates an apparatus 120 that may be the same or similar to apparatus 100 of FIG. 1A, where like elements are similarly numbered. For example, apparatus 120 may comprise a view of a VRB 120 in which a top portion of casing 106 is removed to reveal rotor 104. While referred to herein as rotor 104, it should be understood that the rotor 104 could comprise any suitable material or configuration including but not limited to the other embodiments described herein.

As shown in FIG. 1B, rotor 104 may be a circular disc that is secured to motor and/or hub 102 in some embodiments. For example, rotor 104 may include an outer radius 105 and an inner radius 107 in some embodiments, where the outer radius comprises the perimeter of the rotor 104 and the inner radius 107 comprises an opening to accommodate and/or secure the rotor 104 to the motor and/or hub 102. In some embodiments, the inner radius 107 is selected to coincide with a radius of the motor and/or hub 102.

Figure 1C:
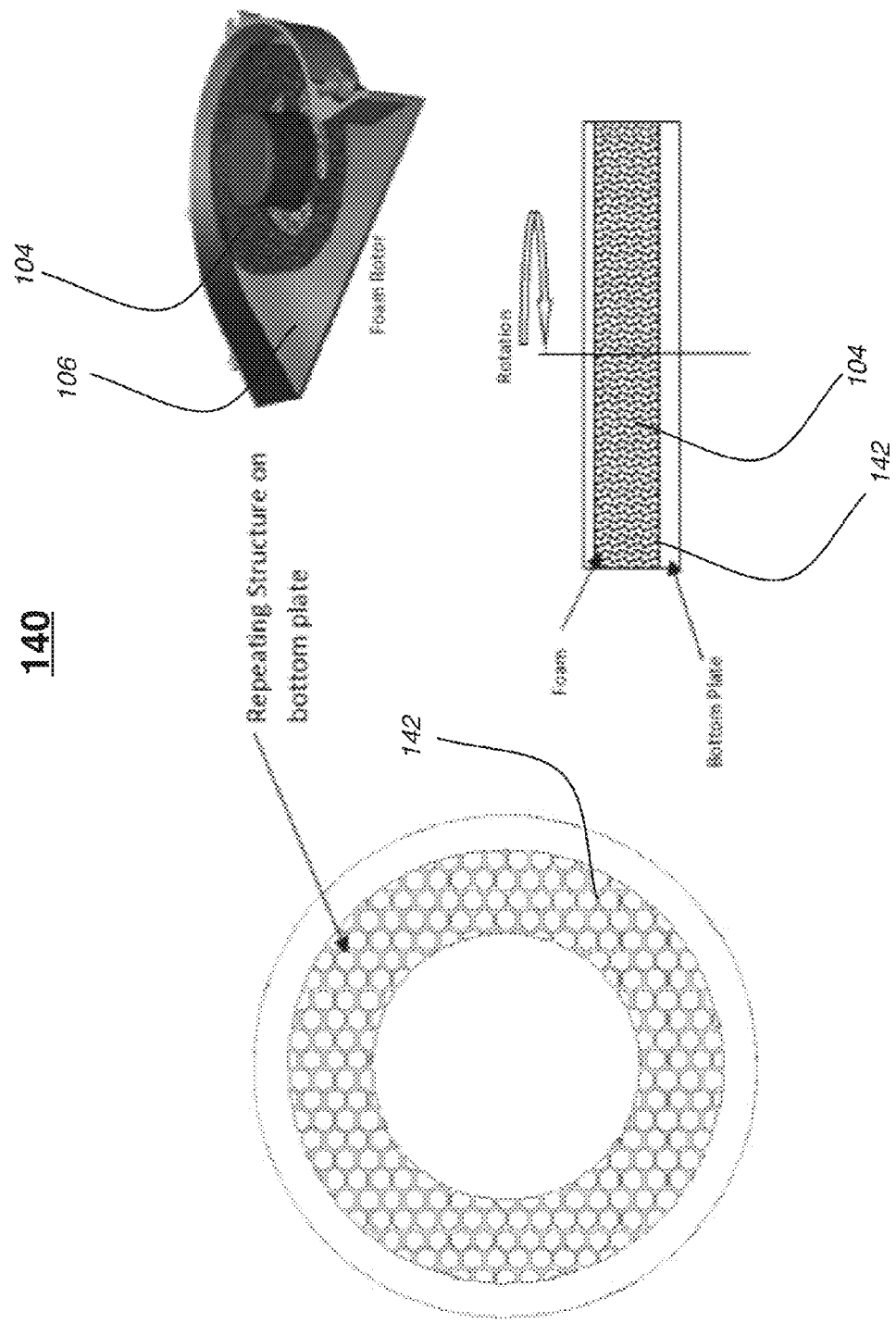
FIGS. 1C-1D illustrates embodiments of a rotor plate.

FIG. 1C illustrates an apparatus 140 that may be the same or similar to apparatus 100 of FIG. 1A and apparatus 120 of FIG. 1B, where like elements are similarly numbered. For example, apparatus 150 may comprise another view of a VRB 140 in which a top portion of casing 106 is removed to reveal rotor 104 and may additional show side view of the rotor 104 and a bottom plate 142 in some embodiments.

In various embodiments, FIG. 1C may more clearly illustrate the porosity of rotor 104. In the embodiments shown in FIG. 1C, rotor 104 may comprise or be composed of any suitable material having porosity capable of generating a flow of air in VRB 140. Porosity or void fraction may comprise a measure of the void or empty spaces in a material, and is a fraction of the volume of voids over the total volume, between 0-1, or as a percentage between 0-100%. In various embodiments, the rotor 104 or a porous portion of the rotor 104 may comprise a material selected to have between 10 pores per inch (ppi) and 100 ppi. Other embodiments are described and claimed.

In some embodiments, rotor 104 may comprise a solid foam material as shown in FIG. 1C. Solid foams may comprise an important class of lightweight cellular engineering materials. In various embodiments, these foams can be classified into two types based on their pore structure: open-cell-structured foams (also known as reticulated foams) and closed-cell foams. Rotor 104 may comprise an open-cell-structured foam material in some embodiments.

In various embodiments, open-cell-structured foams contain pores that are connected to each other and form an interconnected network that is relatively soft. Open-cell foams will fill with whatever they are surrounded with in some embodiments. For example, open-cell foam may be filled with air. In various embodiments, rotor 104 may be spun by motor and/or hub 102, resulting in the rotor 104 creating a volumetric resistance inside the casing 106. In some embodiments, the volumetric resistance may cause a flow of air to be drawn into the one or more inlets 108 and out of the outlet 110. In some embodiments, 104 may be arranged to pump water or other materials. The embodiments are not limited in this respect.

The rotor 104 may be arranged to generate a centrifugal force that causes a flow of air to flow through the rotor 104 in some embodiments. For example, the open-cell-structured foam material of rotor 104 may allow for air to fill the open cells and to pass through the rotor 104 in some embodiments. Other embodiments are described and claimed.

In various embodiments, the casing 106 may include top and bottom inlets 108 as described above. The rotor 104, however, when constructed from a porous material such as foam or fabric that is not entirely self-supporting, may require use of a bottom plate 142 to support the rotor 104. The bottom plate 142 may comprise a rigid flat plate that is affixed to or that supports the rotor 104. In some embodiments, the bottom plate 142 may block the bottom inlet 108. As a result, previous solutions to allow flow to be maintained through the bottom inlet 108 include a bottom plate 142 as shown in FIG. 1C, where a pore structure is created in the bottom plate 142.

Figure 1D:
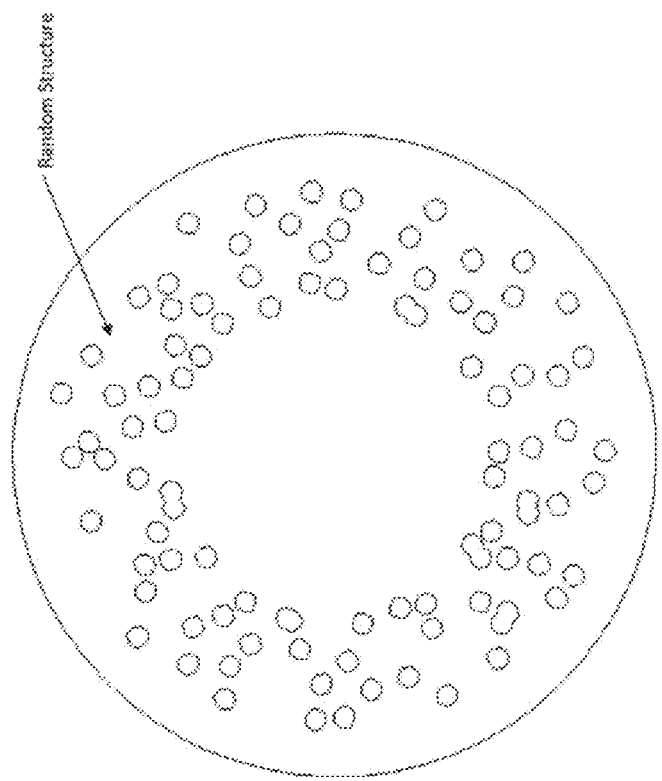

The pore structure shown in bottom plate 142 includes a plurality of uniformly repeating holes in the bottom plate 142 that, when the bottom plate 142 and rotor 104 are spun, create a tone that may be undesirable. As a result, in some embodiments, a bottom plate 160 as shown in FIG. 1D may be used that includes a random structure of holes to reduce or substantially eliminate the tone created by the uniformly repeating holes in the bottom plate 142. The bottom plate 160 may include or comprise a randomly or pseudo-randomly generated pattern of holes with random size and random radial locations. Additionally, the bottom plate 160 may be designed such that the rotor maintains a balance about the axis of rotation through a constrained optimization algorithm used to design the random pattern. Other embodiments are described and claimed.

FIGS. 2A-2G illustrate a plurality of different rotors 104. Each of the rotors may be the same or similar to the rotors 104 described above and as described elsewhere herein. While a limited number, type and arrangement of materials and configurations are shown in the embodiments described in FIGS. 2A-2G, it should be understood that the embodiments are not limited in this respect. The embodiments shown in FIGS. 2A-2G may comprise different views of rotor in which the rotor has been removed from casing 106 to reveal additional details.

While not limited in this respect, various rotors described herein may comprise a circular shape having a substantially contiguous radius in some embodiments. In various embodiments, the substantially contiguous radius may comprise a flat or smooth edge that forms the outer perimeter of rotor 104. While shown as a substantially flat radial surface in some embodiments, it should be understood that the edges or corners of the radial surface may be rounded, non-contiguous or otherwise shaped to form cylindrical foam block rotor 104 and still fall within the described embodiments.

In some embodiments, the rotor may comprise a substantially flat top surface having no blades or fins and a substantially flat bottom surface having no blades or fins. Unlike traditional blade-based rotors, a bladeless rotor as described in some embodiments herein may comprise substantially flat surfaces or portions of the rotor may comprise substantially flat surfaces that may produce less acoustic noise than rotors having discontinuities like blades and fins. Other embodiments are described and claimed.

Figure 2A:
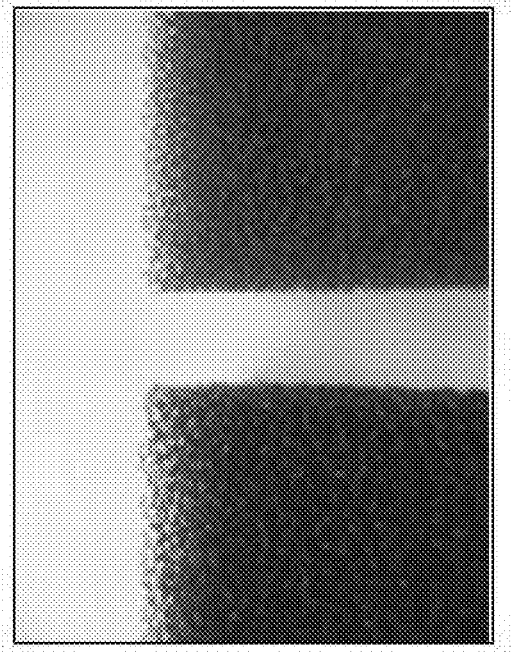
FIG. 2A illustrates embodiments of rotor materials.
Figure 2A:
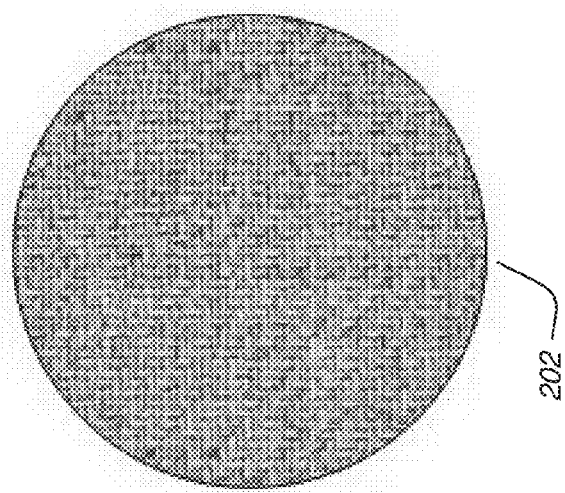

FIG. 2A shows materials 200 that may, in some embodiments, be used to form all or a portion of a rotor 104 and other rotors described herein. For example, material 202 may comprise a fabric material. The fabric material 202 shown in FIG. 2A may comprise a woven fabric but the embodiments are not limited in this respect. The woven fabric 202, by way of the manner in which it is fabricated, may include a plurality of holes or pores between the threads of the fabric. These pores may be of any size and any number depending on the pattern, material and structure of the fabric 202. In another embodiment shown in FIG. 2A, the material used for all or part of rotor 104 may comprise a foam material 204 or any other suitable porous material as previously described. While not shown, in some embodiments the rotor 104 may be constructed from a plurality of different materials (e.g. fabric 202 and foam 204 combination, for example) or from multiple layers of a single material, such as multiple layers of fabric 202. Other embodiments are described and claimed.

Figure 2B:
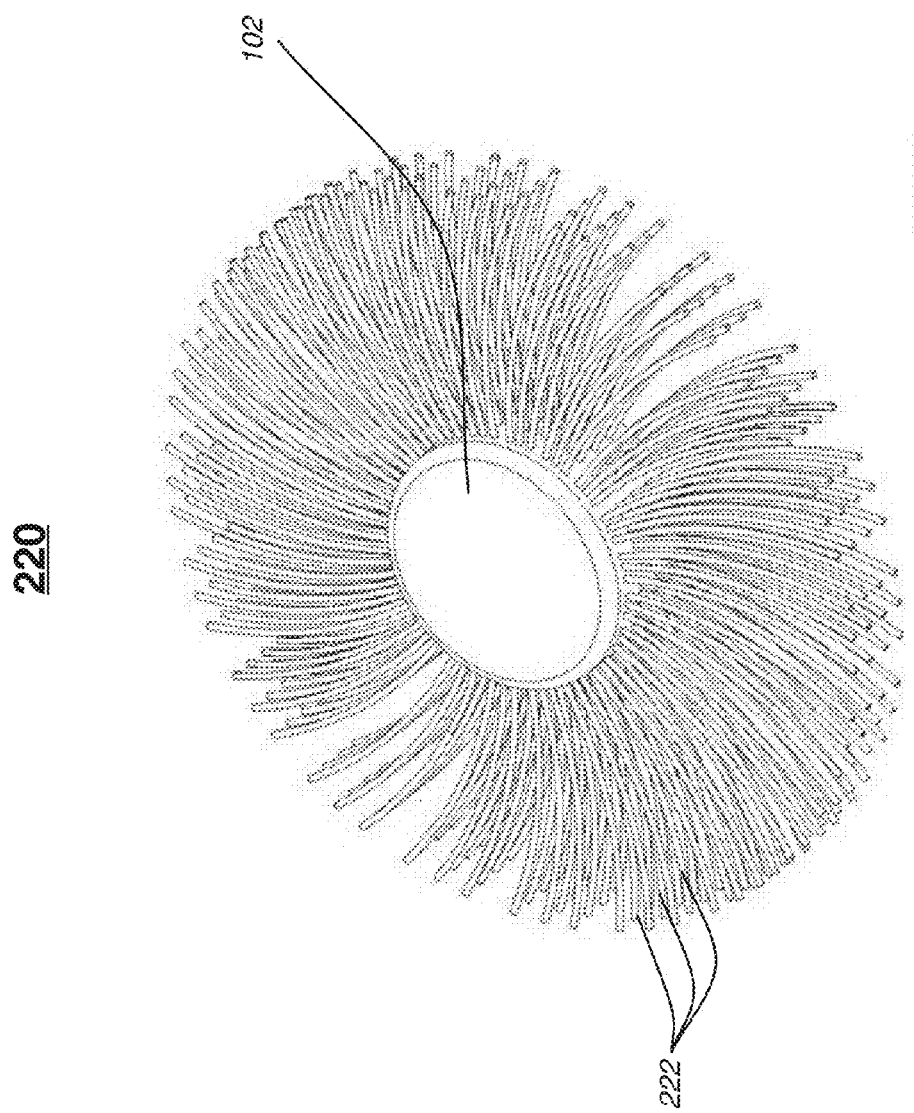

FIG. 2B illustrates one embodiments of a rotor 220 that may be the same or similar to rotor 104 and other rotors as described elsewhere herein. The rotor 220 may include a hub 102 arranged to support a plurality of bristles 222 in some embodiments. In various embodiments, the plurality of bristles 222 may comprise or create the porous material of the rotor 220. The plurality of bristles 222 may be arranged in a random or pseudo-random pattern in various embodiments. The random or pseudo-random alignment of the bristles may help to reduce or eliminate tones (e.g. blade-pass or other tones) commonly found in traditional blade-based rotors. In some embodiments, the bristles may comprise a plastic or metal material having rigidity selected such that the bristles are self-supporting. For example, the bristles may comprise a metal or hard plastic material. The rotor 220 may provide for simplified manufacturing compared to traditional rotors and may be less susceptible to dust accumulation than traditional rotors. The embodiments are not limited in this respect.

FIG. 2C illustrates two related views of an embodiments of a rotor 240 that may be the same or similar to rotor 104 and other rotors as described elsewhere herein. In various embodiments, the rotor 240 may comprise a combination or hybrid of a traditional blade based rotor and foam or other porous material 250. For example, the rotor 240 may include or comprise a plurality of blades or fins 242 arranged between a hub 102 and an outer ring 262 comprising a top plate 244 and a bottom plate 246. Stated differently, the plurality of blades or fins 242 may be coupled on a first end to the hub 102 arranged to support the rotor 240 and to couple the rotor 240 to a motor and on a second end to the outer ring 262.

In various embodiments, the porous material 250 may be arranged around at least a portion of one or more of the plurality of blades or fins 242. Additionally or alternatively, the porous material 250 may be arranged in one or more of a space between one or more of the plurality of blades or fins 242, a space between the hub 102 and the outer ring 262 and a space between the top side 244 and bottom side 246 of the outer ring 262. The embodiments are not limited in this respect.

In various embodiments, the plurality of blades or fins 242 may be arranged as or similar to standard rotor blades or fins. In these embodiments, the foam or other material used to form the remaining/filler portions of the rotor 240 may be formed or arranged around or to surround or enclose at least a portion of the blades or fins 242. The blades or fins 242 and the outer ring 262 may provide structural support and rigidity to allow the rotor 240 to support the porous material 250 in some embodiments. An arrangement as shown in FIG. 2C may provide an increase in system performance and electric power consumption decrease compared to use of a traditional rotor. While a limited number and arrangement of blades or fins 242 and outer ring 262 are shown in FIG. 2C, it should be understood that any number, type or arrangement of components could be used and still fall within the described embodiments. As such, other embodiments are described and claimed.

Figure 2D:
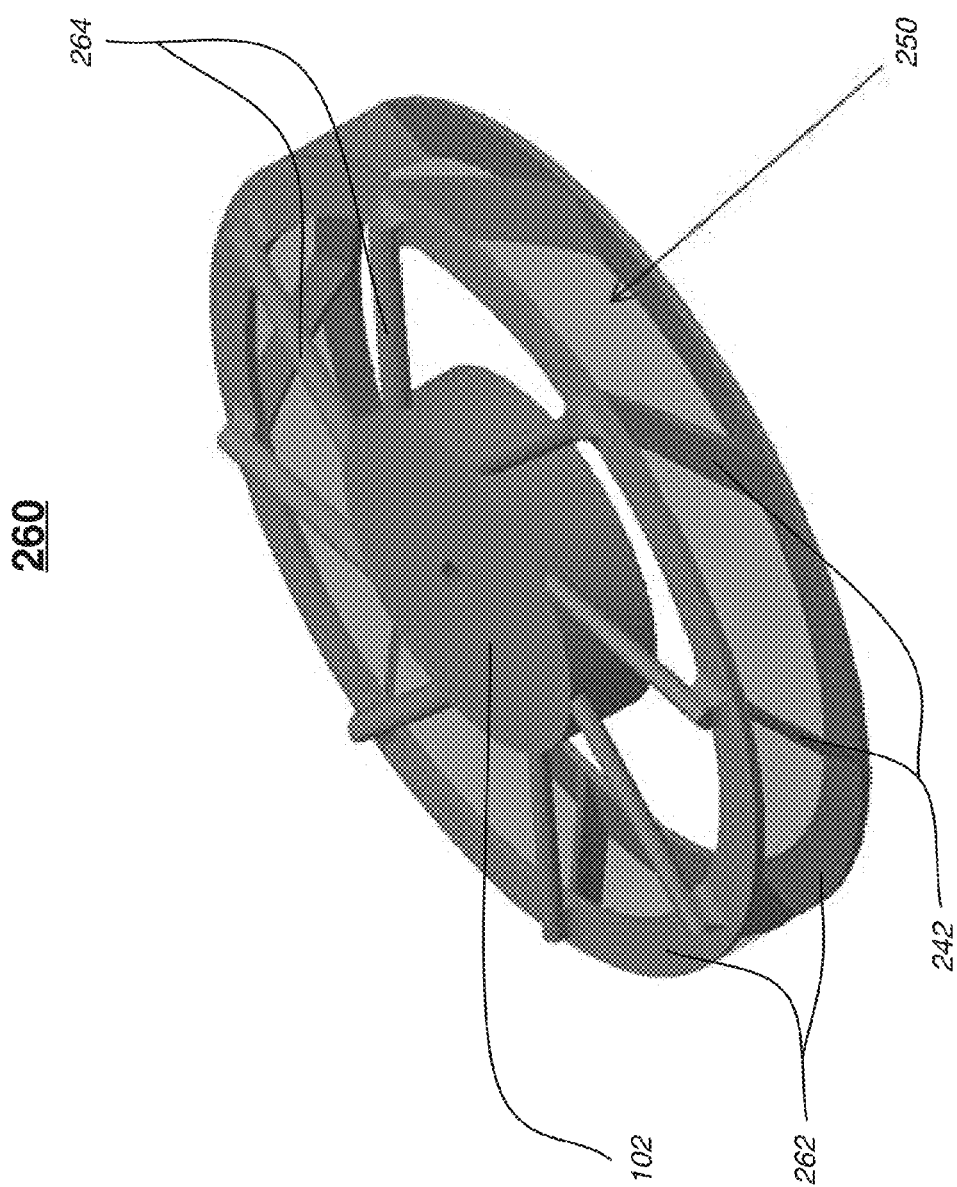

FIG. 2D illustrates two related views of an embodiment of a rotor 260 that may be the same or similar to rotor 104 and other rotors as described elsewhere herein. In various embodiments, the rotor 260 may comprise a combination or hybrid of a traditional blade based rotor and foam or other porous material 250 similar to the rotor 240 of FIG. 2C. In various embodiments, the rotor 260 may include supports 264 to couple the outer ring 262 to the hub 102 and the plurality of blades or fins 242 may be arranged between the top plate and bottom plate of the outer ring 262. Additionally, the porous material 250 may be arranged in the outer ring 262 around or between the blades or fins 242. The embodiments are not limited in this respect.

Figure 2E:
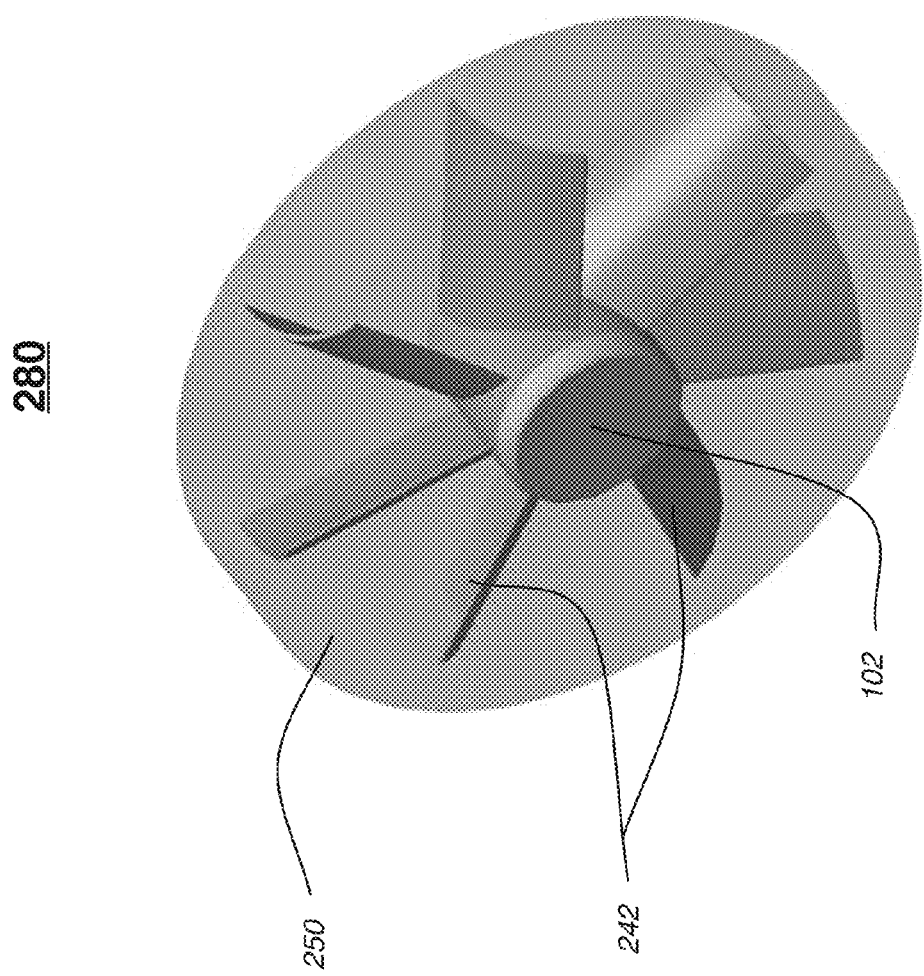

FIG. 2E illustrates an embodiment of a rotor 280 that may be the same or similar to rotor 104 and other rotors as described elsewhere herein. In various embodiments, the rotor 280 may comprise a porous material 250 arranged around, surrounding or to enclosure or substantially enclose a plurality of blades or fins 242 and/or a rotor 102. For example, the rotor 280 may comprise a traditional blade-based rotor that may be covered in foam or another suitable porous material 250 to form cylindrical foam block rotor 280, where the traditional rotor provides the structural support and rigidity for the cylindrical foam block rotor 280. The blades or fins 242 may be altered to change the flow path or other characteristics of a blower. For example, the blades or fins 242 shown in FIG. 2E may be suited for an axial fan that promotes airflow through the porous material 250. While a limited number and arrangement of blades or fins 242 and rotor 102 are shown in FIG. 2E, it should be understood that any number, type, arrangement or configuration could be used and still fall within the described embodiments. As such, other embodiments are described and claimed.

Figure 2F:
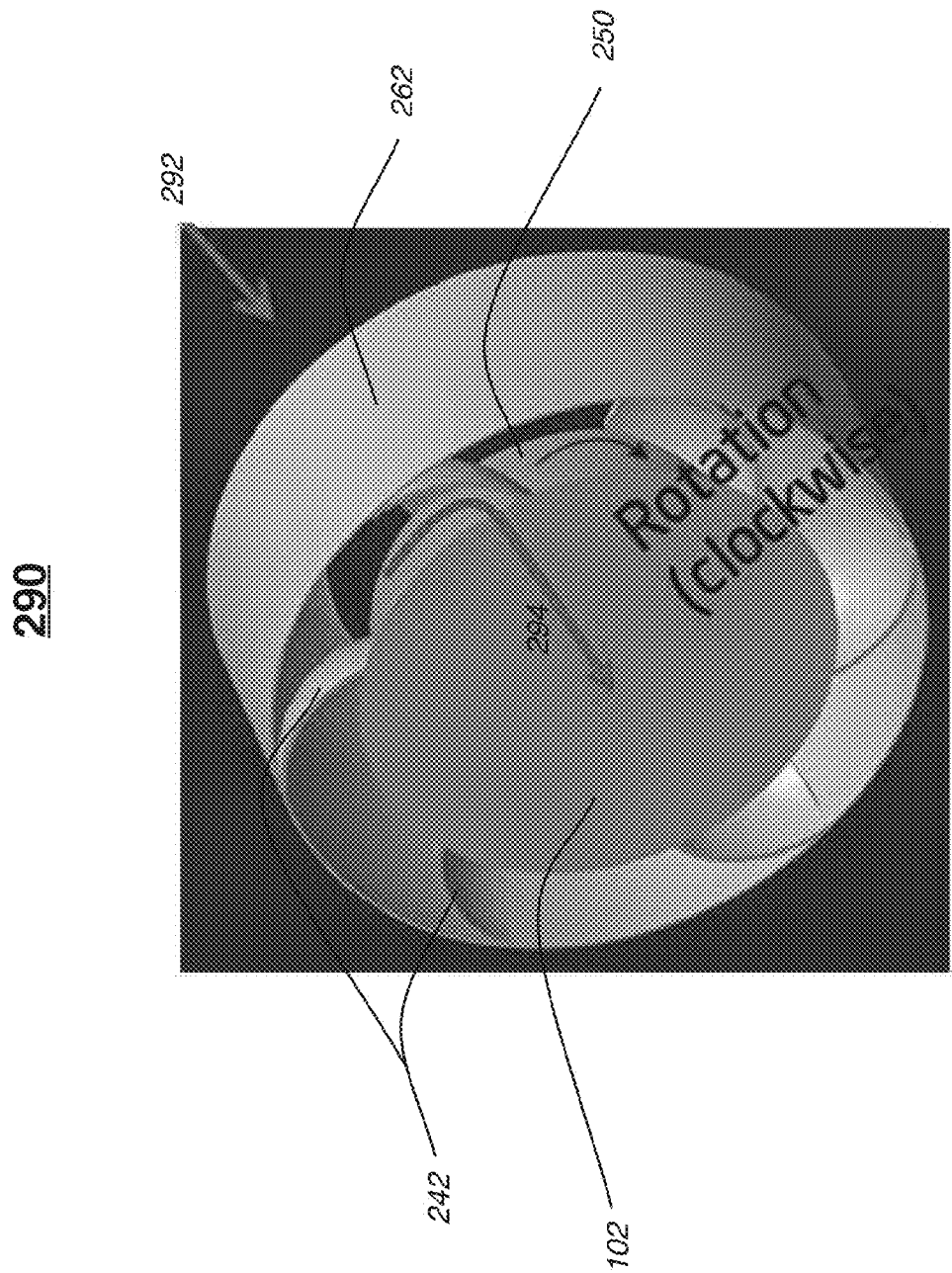

FIG. 2F illustrates an embodiment of a rotor 290 that may be the same or similar to rotor 104 and other rotors as described elsewhere herein. In various embodiments, the rotor 290 may comprise a stationary portion comprising a hub 102, a plurality of blades or fins 242 and an outer ring 262 and a porous material 250 arranged to rotate or be spun to generate a flow of air through a blower. For example, the stationary portion may be arranged to support the porous material 150 and to direct the airflow as shown with airflow in 292 and airflow out 294. In some embodiments, this structure may provide some of the benefits of a traditional blower in terms of rigidity and directing airflow, and also include the benefits discussed herein related to using a porous material to generate the airflow, such as reduced noise. Other embodiments are described and claimed.

Figure 2G:
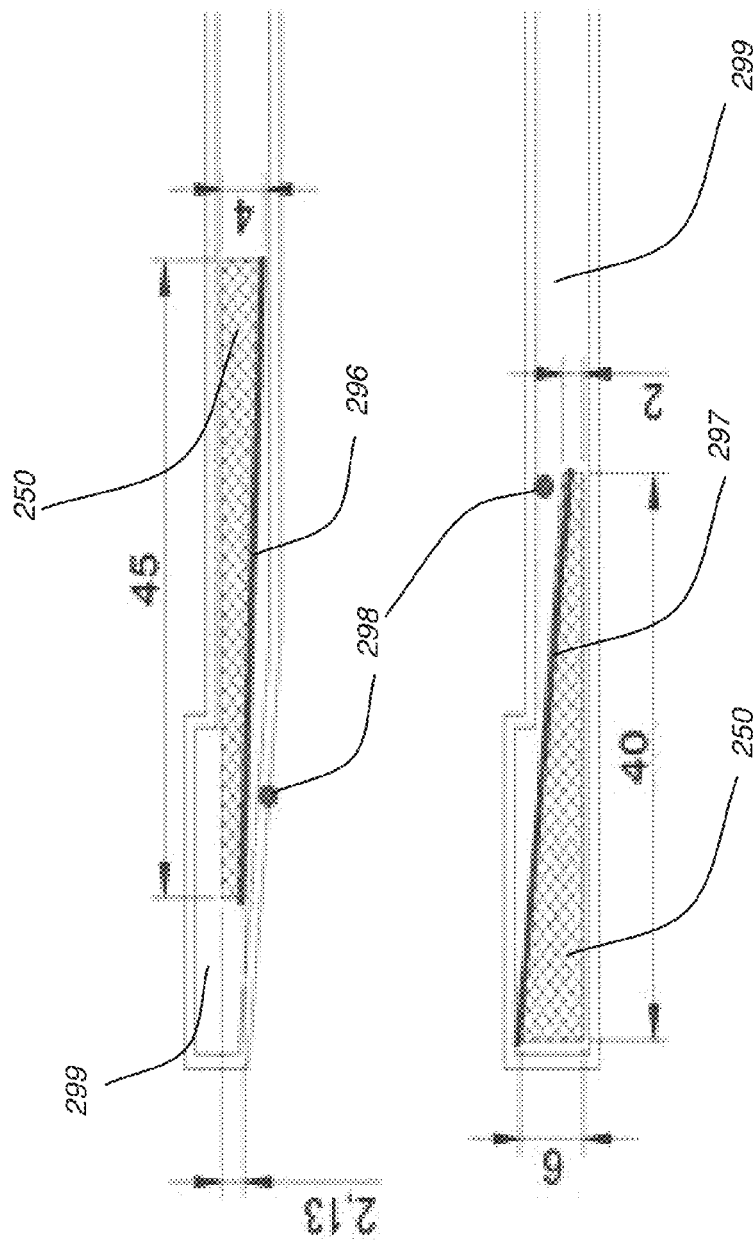

FIG. 2G illustrates two embodiments of a rotor 295 that may be the same or similar to rotor 104 and other rotors as described elsewhere herein. In various embodiments, the rotor 290 may comprise a conformal rotor arranged to continuously change size/shape as it rotates to accommodate a different sized enclosure or casing. For example, the rotor 290 may comprise a porous material 250 arranged between one or more of a top plate 297 and/or a bottom plate 296. In some embodiments the porous material 250 may be arranged to continuously conform to an available internal height of an enclosure or casing based on changes in an angle of one or more of the top plate 297 or bottom plate 296. For example, the changes may be based on contact of the top plate 297 or bottom plate 296 with another surface, such an interior wall of enclosure 299 of a portable computing system. In other embodiments, the contact surface may comprise a casing 106 for the blower/rotor 295 that is arranged to fit in a space that does allow for a consistent vertical height of a blower/rotor, such as a casing that narrows or angles to a point in one or more directions.

In various embodiments, the porous material 250 (e.g. foam or the like) may be sandwiched between the top and bottom plates 297, 296. The plates 297, 296 may comprise magnetic plates for example. As the rotor 295 spins, the rotor height may be allowed to continuously change, conforming to available internal Z height of the relevant enclosure or casing. Stated differently, the porous material 250 may be selected to have a stiffness or density that allows the material to be compressed or pinched as it spins. In various embodiments, this type of blower/rotor may allow for the blower/rotor to be arranged in an angled cavity to conserve space.

A bearing 298 may be arranged in contact with one or more of the top 297 and/or bottom plate 296 to provide a running surface that contacts an inner wall of an enclosure or casing in some embodiments. In this arrangement, the porous material 250 itself is not pressing on the inside of the enclosure or casing, allowing for smooth operation and rotation of the rotor 295. The embodiments are not limited in this respect.

While the rotors described herein that include a porous material may provide significant iso-acoustic performance enhancements along with other improvements over traditional blower/rotor designs, there are certain limitations associated with the porous materials described above. For example, commercially available porous material such as foam has a thickness limitation of approximately 2.5 mm. This may be due, for example, to limitations of the material such as pore size in relation to material thickness or height that may compromise the structural integrity of the material. As such, it may be difficult to create an ultra-thin blower utilizing this type of material. Therefore, it may be desirable in some embodiments to create a rotor that is porous and rigid at substantially smaller thicknesses.

FIGS. 3A-3D illustrate embodiments of a plurality of rotors and blowers that may be the same or similar to rotor 104 and other rotors as described elsewhere herein. The rotors in described in FIGS. 3A-3D, however, may comprise or are constructed from metal or a similar rigid material allowing for an ultra-thin design and use in an ultra-thin blower. Other embodiments are described and claimed.

Figure 3A:
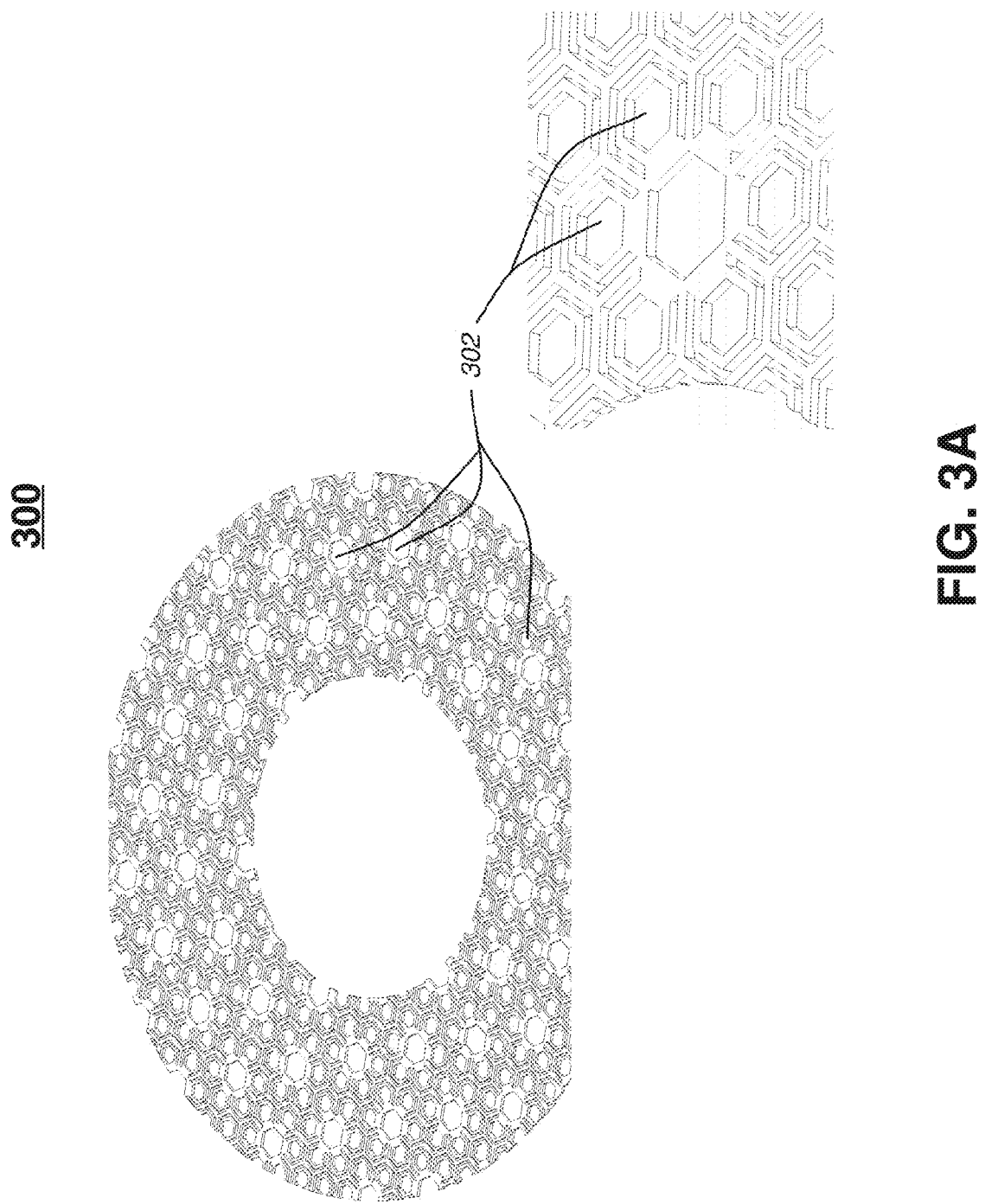

FIG. 3A illustrates one embodiment of a rotor 300 that may be the same or similar to rotor 104 and other rotors as described elsewhere herein. The rotor 300 may comprise a cylindrical metal disk having a plurality of stamped or cut portions 302 on a flat surface of the disk. The rotor 300 shown in FIG. 3A may comprise a metal disk in which the plurality of stamped or cut portions have been made to a rigid material such as sheet metal or the like. The plurality of stamped or cut portions 302 may comprise a plurality of round, hexagonal (as shown) or other shaped tabs that are cut or stamped into the rotor 300. These openings may create a porous surface to allow air (or any other suitable liquid) to pass through the rotor 300. The size, spacing and arrangement of the plurality of stamped or cut portions 302 may be selected to create a random or pseudo-random pattern to avoid tones associated with repeated patterns. The embodiments are not limited in this respect.

Figure 3C:
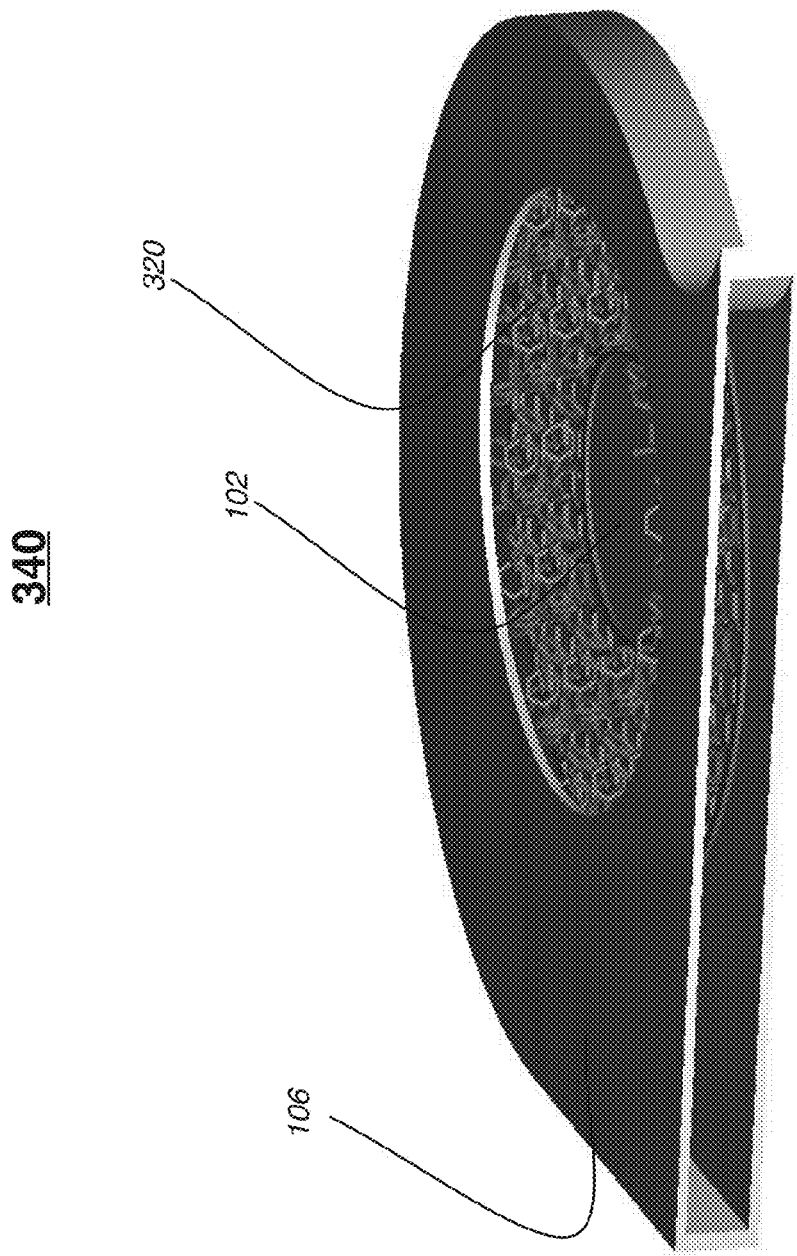
FIG. 3C illustrates an embodiment of a blower.

In various embodiments, the one or more of the plurality of stamped or cut portions 302 may be bent in a random or pseudo-random manner with respect to the flat surface of the rotor 300/320 to create an uneven porous surface as shown in FIG. 3B that illustrates one embodiment of a rotor 320 that may be the same or similar to rotor 104 and other rotors as described elsewhere herein, including rotor 300. The plurality of stamped or cut portions 302 may be bent at different angles with respect to the flat surface of the disc, in different directions and may be twisted to create a variably textured surface in some embodiments. As shown in FIG. 3C, this type of rotor (e.g. rotor 300 or rotor 320) may be used in a smaller casing 106 compared to other rotors described herein allowing for a smaller/thinning blower design while maintaining the same or similar iso-acoustic and performance benefits to the other blowers and rotors described elsewhere herein.

FIG. 3D illustrates one embodiment of a rotor 360 that may be the same or similar to rotor 104 and other rotors as described elsewhere herein, including rotors 300 and 320. Rotor 360 may similarly comprise or be constructed from a single piece of low cost sheet metal or the like. In various embodiments, a plurality of tabs 362 may be cut or stamped into the rotor 360 and these tabs may be bent to create an even surface. This cutting/stamping and bending may create gaps or holes 364 in the rotor 360 to enable a porous rotor design. While shown in FIG. 3D as being bent in a same direction and to a same degree, it should be understood that the embodiments are not limited in this respect and the size, shape, and configuration of the rotor 360 and tabs 362 could be changed and still fall within the described embodiments.

The rotors described in FIGS. 3A-3D may be designed using a forming method to enable easy manufacture of the rotors from, for example, inexpensive sheet stock, sheet metal or another similar material. While these embodiments may have mechanical manufacturing complexities, the costs to create such rotors are purely capital for tooling, since the material itself is made from high volume sheet stock which is generally inexpensive and readily available.

Manufacturing rotors similar to those described above in FIGS. 3A-3D may comprise a method including but not limited to the steps stamping or cutting a plurality of different sized tabs into a flat sheet metal material, bending, in a plurality of directions and angles with respect to the flat surface, one or more of the plurality of stamped or cut tabs in a random or pseudo-random pattern to create an uneven and porous surface, and stamping or cutting the flat sheet metal material into one or more cylindrical sheet metal discs. In various embodiments, as described herein, the cylindrical sheet metal disc rotor may be arranged in a blower casing having one or more inlets and one or more outlets, wherein rotation of the cylindrical sheet metal disc creates a volumetric resistance inside the casing to cause a flow of air to be drawn into the one or more inlets and out of the one or more outlets. Other embodiments are described and claimed.

The blowers described herein including a cylindrical rotor to create a volumetric resistance inside a casing of the blower, wherein at least a portion of the rotor comprises a porous material may have many benefits over traditional fan/blade based rotors. In addition to the volumetric resistance causing a flow of air to be drawn into the one or more inlets and out of the one or more outlets of the casing, the blowers and rotors described herein may be arranged to generate a centrifugal force to cause a flow of air to flow through the porous material of the rotor. Moreover, these rotors may be arranged to generate low iso-acoustic interference compared to a traditional blade-based rotor. Other benefits will be apparent to one skilled in the art.

Figure 4A:
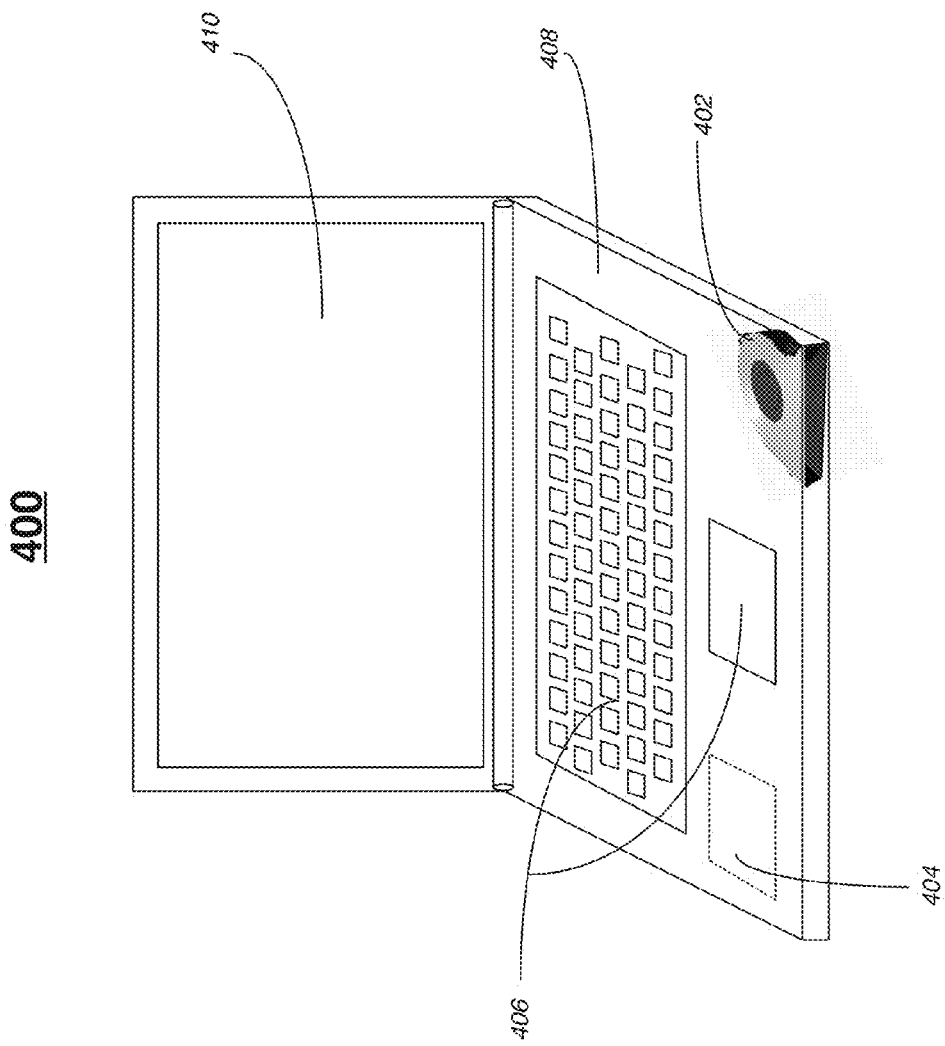
FIG. 4A illustrates an embodiment of a system.

FIG. 4A illustrations one embodiment of a computing system 400. In various embodiments, computing system 400 may comprise a computing device such as a laptop or notebook computer. As shown in FIG. 4A, computing device 400 may include a VRB 402, one or more heat generating or producing components 404, one or more input devices 406, an enclosure 408 and a display 410. While shown in the form of a laptop or notebook computer, it should be understood that the embodiments are not limited in this respect. For example, in some embodiments computing system 400 may comprise a tablet computer, netbook computer, ultra-book computer, tablet, desktop computer, all-in-one (AIO) computer, personal digital assistant (PDA), smartphone, multimedia player or any other suitable device. The computing system 400 is described in more detail with reference to FIG. 6.

While shown and described in conjunction with a computer device in various embodiments, it should be understood that the VRB described herein could be used in any suitable device that requires air to be moved. For example, the VRB described herein may be used in Heating Ventilation and Air Conditioning (HVAC) systems, automotive cooling, desk fans or any other suitable application. Many of these additional usage scenarios include acoustic constraints which may benefit from the implementation of a VRB as described herein. Other embodiments are described and claimed.

In various embodiments, the VRB 402 may be the same or similar to the VRB described above with reference to any of the preceding figures. In some embodiments the VRB 402 may include a rotor as described elsewhere herein and the VRB 402 may be arranged to remove heat generated inside enclosure 408. For the example, the one or more heat generating or heat producing components 404 may comprise a processor, memory or other device that generates heat during operation. VRB 402 may be arranged to remove this heat from system 400 in some embodiments. Other embodiments are described and claimed.

While VRB 402 of FIG. 4 is arranged with its outlet facing in the direction of a user of the system 400, it should be understood that the embodiments are not limited in this respect. For example, VRB 402 may be arranged to provide a rear or side exhaust for the computing system 400. In various embodiments, providing a rear or side exhaust by VRB 402 may avoid a flow of warm air being directed towards a user of the system 400. Additionally, acoustic benefits may be realized through the use of a side or rear exhaust. For example, arranging the outlet of VRB 402 in a direction away from a user of the system 400 may reduce the noise that is audible to the user. Other embodiments are described and claimed.

Figure 4B:
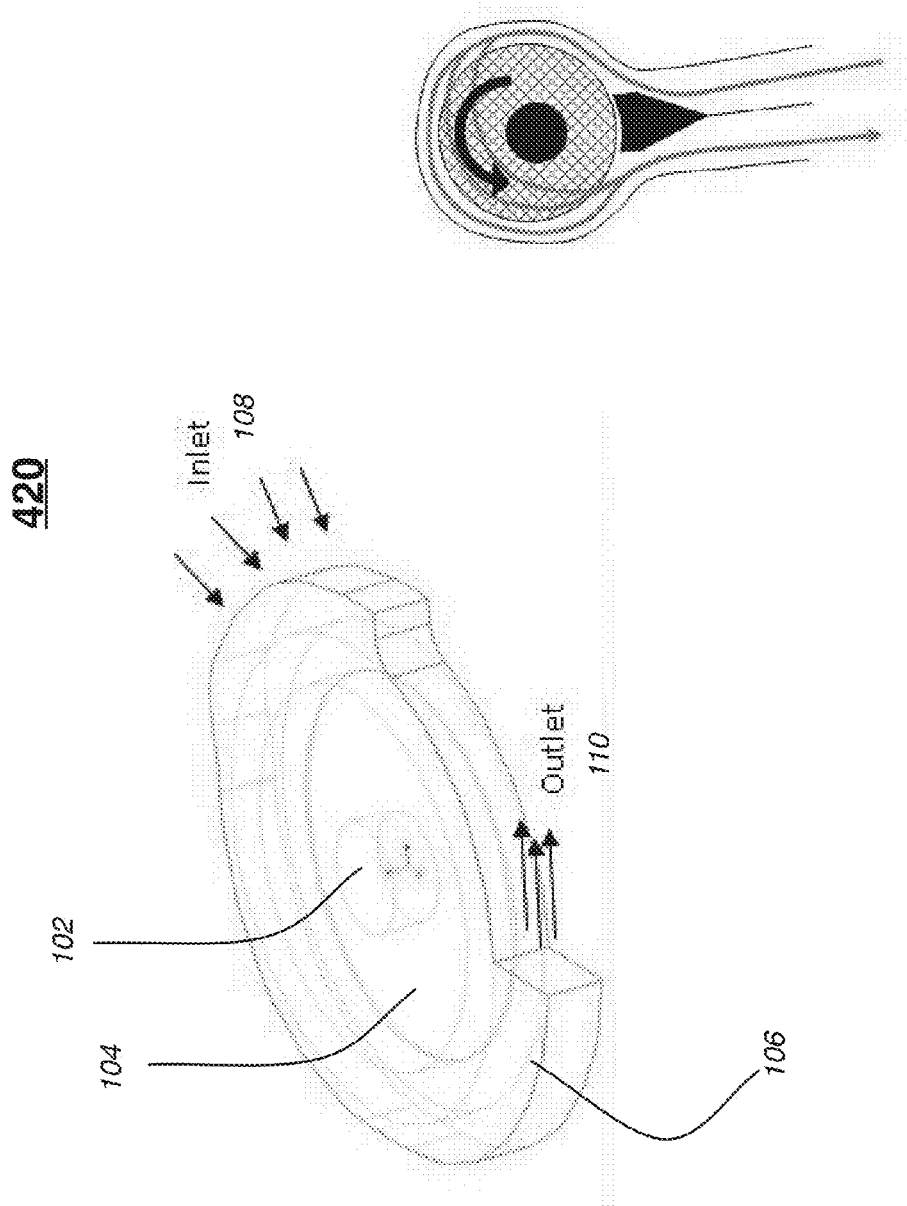
FIGS. 4B-4C illustrate embodiments of blowers.
Figure 4C:
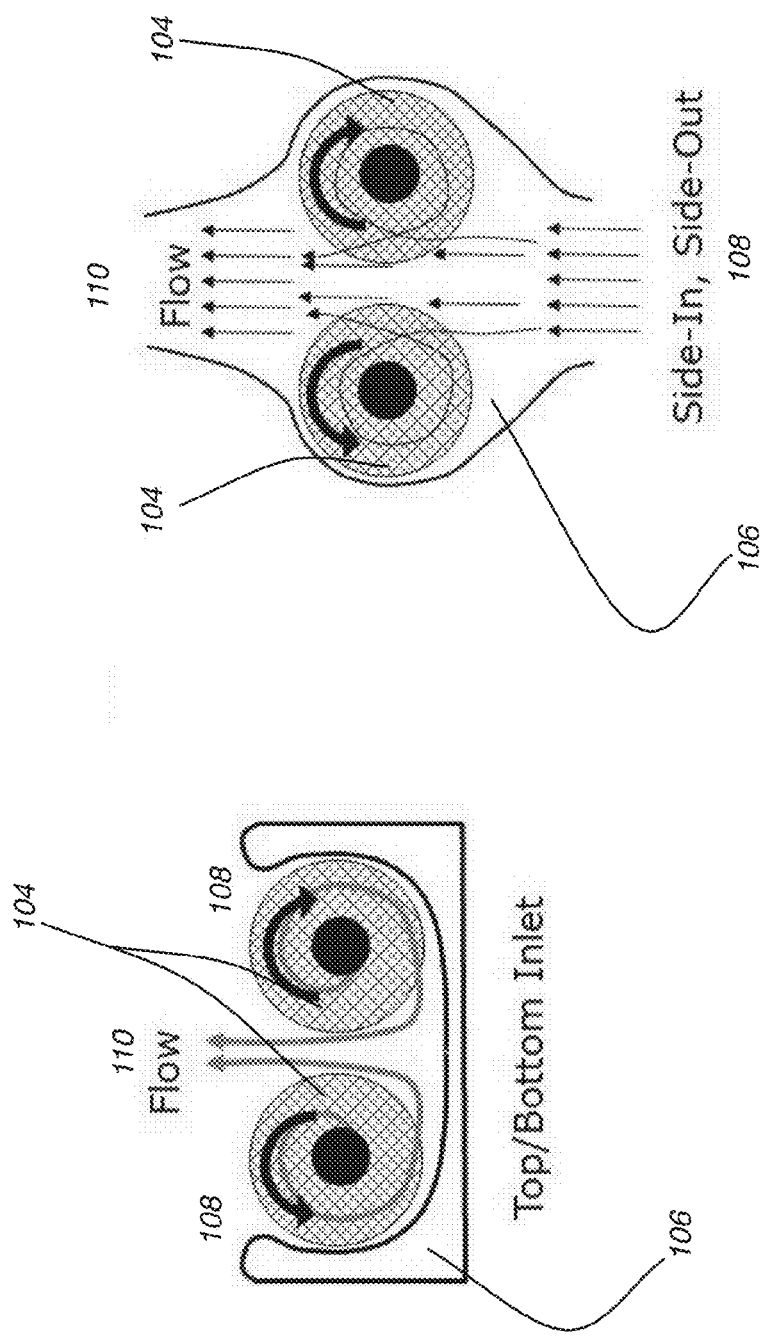

In various embodiments described herein, the VRB includes top and bottom inlets and a side outlet. The embodiments are not limited in this respect. For example, as shown in FIG. 4B the VRB (including a rotor as described elsewhere herein) may include a side inlet 108 and a side outlet 110. Similarly, as shown in FIG. 4C, some embodiments of a VRB may include plurality of rotors as described elsewhere herein. For example, the dual rotor configuration shown on the left of FIG. 4C includes two rotors 104 that are arranged to rotate in opposite directions, draw airflow in around the sides of the casing 106 and force the airflow out 110 between the rotors 104. Similarly, in the side-in, side-out configuration shown on the right of FIG. 4C, the airflow is drawn in 108 on one side of the casing 106 and is forced out 110 through the other side of the casing 106 between the rotors 104 that are arranged to rotate in opposite directions. Other embodiments are described and claimed.

The above-described embodiments may be used to improve airflow in computing systems. Some embodiments may additionally or alternatively improve the acoustic performance of computing systems, which may result in an improved user experience. Other embodiments are described and claimed.

Figure 5A:
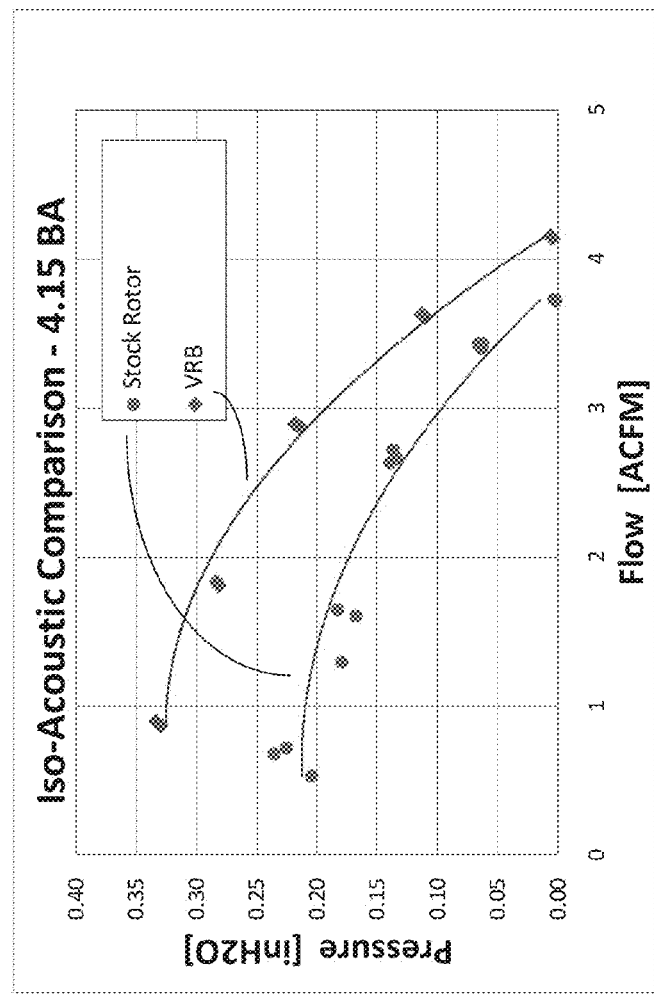
FIG. 5A-5B illustrates embodiments of graphs.

In various embodiments, use of any of the above-described VRBs in a computing system may result in enhanced cooling capability at a constant iso-acoustic level compared to traditional cooling methods that rely on blade-based blowers that have discontinuities that generate an undesirable amount of noise during operation. For example, FIG. 5A illustrates an iso-acoustic comparison for a traditional blade-based rotor (e.g. stock rotor) and a VRB, such as any of the above-described embodiments of a VRB. As shown in FIG. 5A, substantial improvements in both pressure and flow can be achieved through the use of a VRB and one or more rotors as described elsewhere herein.

In various embodiments, traditional blade-based rotors may generate blade pass tones created as a blade passes an obstruction or other object inside a blower casing. For example, as the blades of a traditional rotor pass by a cut-water in the casing, resulting in a repeating tone that at high speeds sounds to a user like a continuous, annoying hum. This may be undesirable from a design and ergonomic perspective. As a result, some blade-based rotor systems are designed to allow a gap between the rotor and the cut-water, which reduces the efficiency of the blower. In various embodiments, use of a VRB and one or more rotors as described herein may allow for the arrangement of the cylindrical foam based rotor 104 in close proximity to the cut-water and other obstructions because the cylindrical foam based rotor 104 does not include blades that would generate blade pass tones. By reducing the space between the cylindrical foam block rotor 104 and the cut-water of the casing, the efficiency of the VRB can be significantly improved.

In various embodiments, the lack of blades or the reduction of the blade exposure as part of the rotor as described herein may allow for higher rotor speeds at the same acoustic noise level of a traditional blade-based rotor. Testing has indicated that as much as a 20%-30% iso-acoustic flow improvement can be achieved using one or more rotors as described herein in place of a traditional blade-based rotor.

Figure 5B:
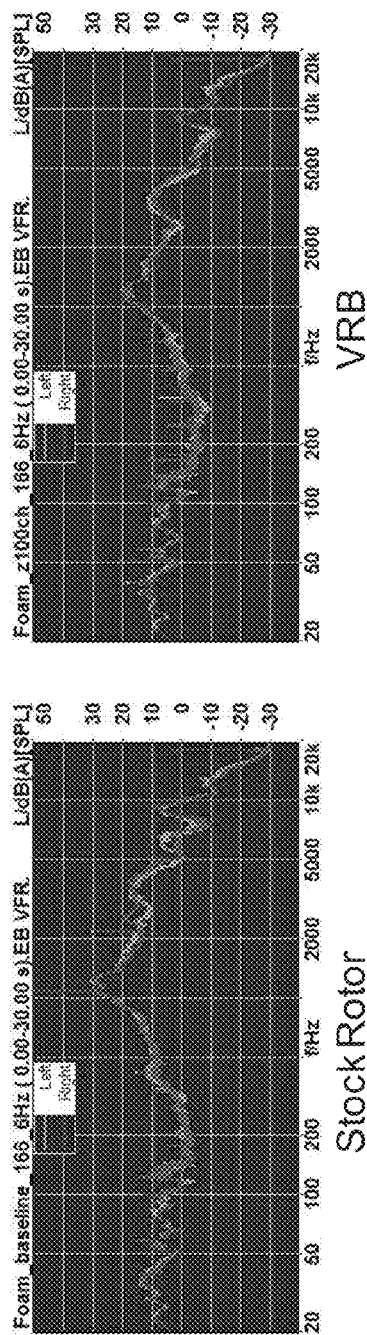
Figure 5C:
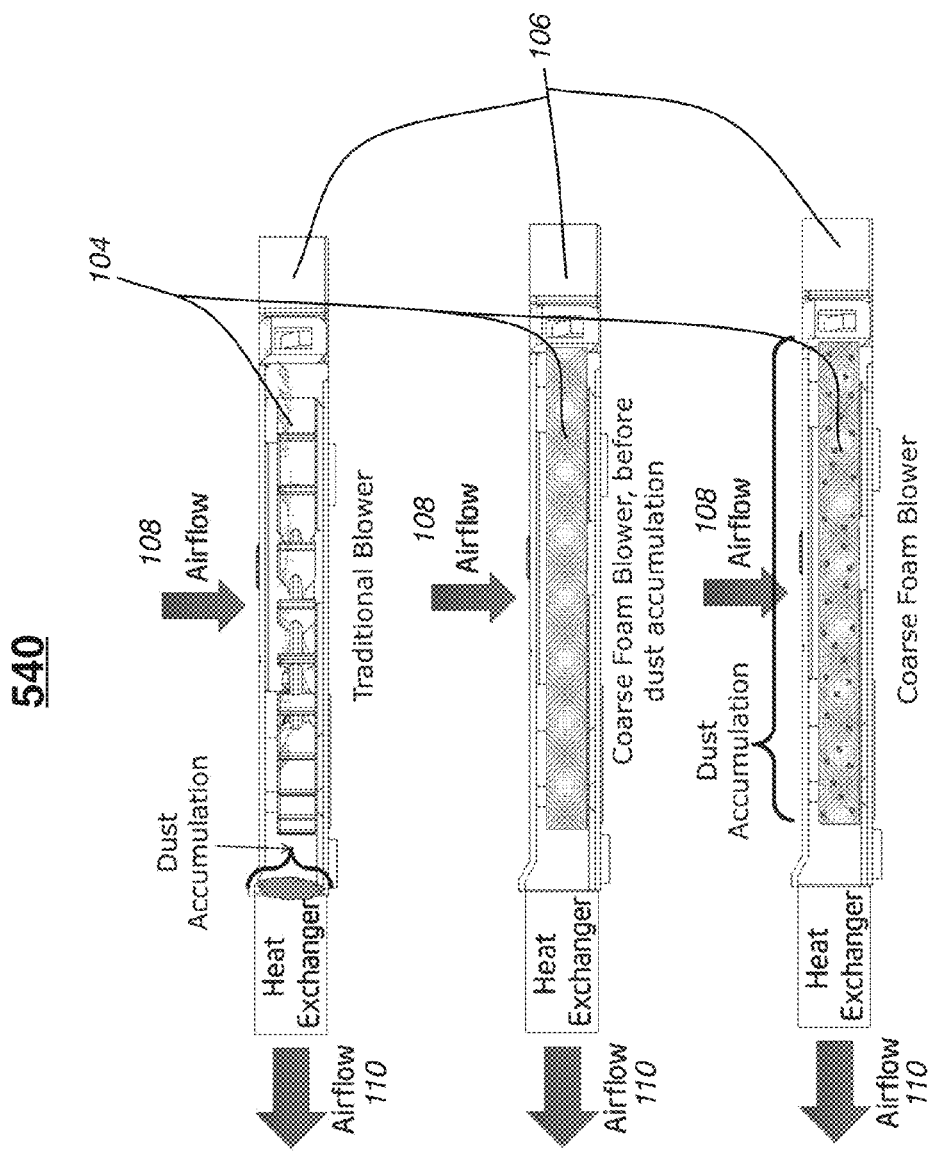
FIG. 5C illustrates embodiments of a blower.

FIG. 5B includes two graphs showing the acoustic performance of a stock rotor (e.g. blade-based rotor) and a VRB as described herein. As shown in FIG. 5B, a rotor as described herein may be arranged to generate low iso-acoustic noise or interference compared to a traditional or stock blade-based rotor. For example, the spikes present in the middle-right portion of the stock rotor graph may be caused by blades passing by the cut-water of the casing. This may occur throughout the 500-5000 Hz range that may be particularly sensitive to human hearing. As a result, these acoustic disturbances may be particularly troubling to human users.

The VRB graph shown in FIG. 5B, however, shows fewer spikes and a more uniform spectrum. The spectrum of the VRB would, in some embodiments, be less annoying or bothersome to a user and have an improved sound quality when compared to that of the stock rotor. Because humans are sensitive to tone and to pitch, the improved sound quality of the VRB may result in psychoacoustic benefits not realized by traditional or stock blade-based rotors. Other embodiments are described and claimed.

In various embodiments, the use of a porous material to form all or part of a rotor as described herein may make the rotor susceptible to dust collection. Over the life of a computing device, dust collects in the interior airflow pathways. This accumulation of dust may clog airflow pathways and heat exchanger surfaces, which may lead to degraded thermal performance of the computing system. By controlling the location of the dust accumulation through use of a porous rotor material, these and other disadvantages may be transformed into advantages.

By utilizing a rotor that includes a coarse porous material, dust may be allowed to accumulate on the rotor over the life of the computing system. For example, as shown in the various stages illustrated in FIG. 5C, the traditional blower at the top of FIG. 5C does not allow for dust accumulation, while the porous material blowers shown in the middle and bottom of FIG. 5C allow dust to accumulate over time.

In various embodiments, the porous material being arranged to accumulate dust may actually increase iso-acoustic performance of the rotor. This increase may be due to the increase of the porous material strand diameter and surface roughness, which may entrain more flow. In various embodiments, the dust-accumulating porous material may be removable, replaceable or cleanable for maintenance purposes. As shown in FIG. 5D that shows a graph of sound pressure versus flow both before and after dust is accumulated on a rotor as dust is accumulated while the flow either remains the same or increases. These and other advantages may result from the use of rotors including a porous material as described herein.

Figure 6:
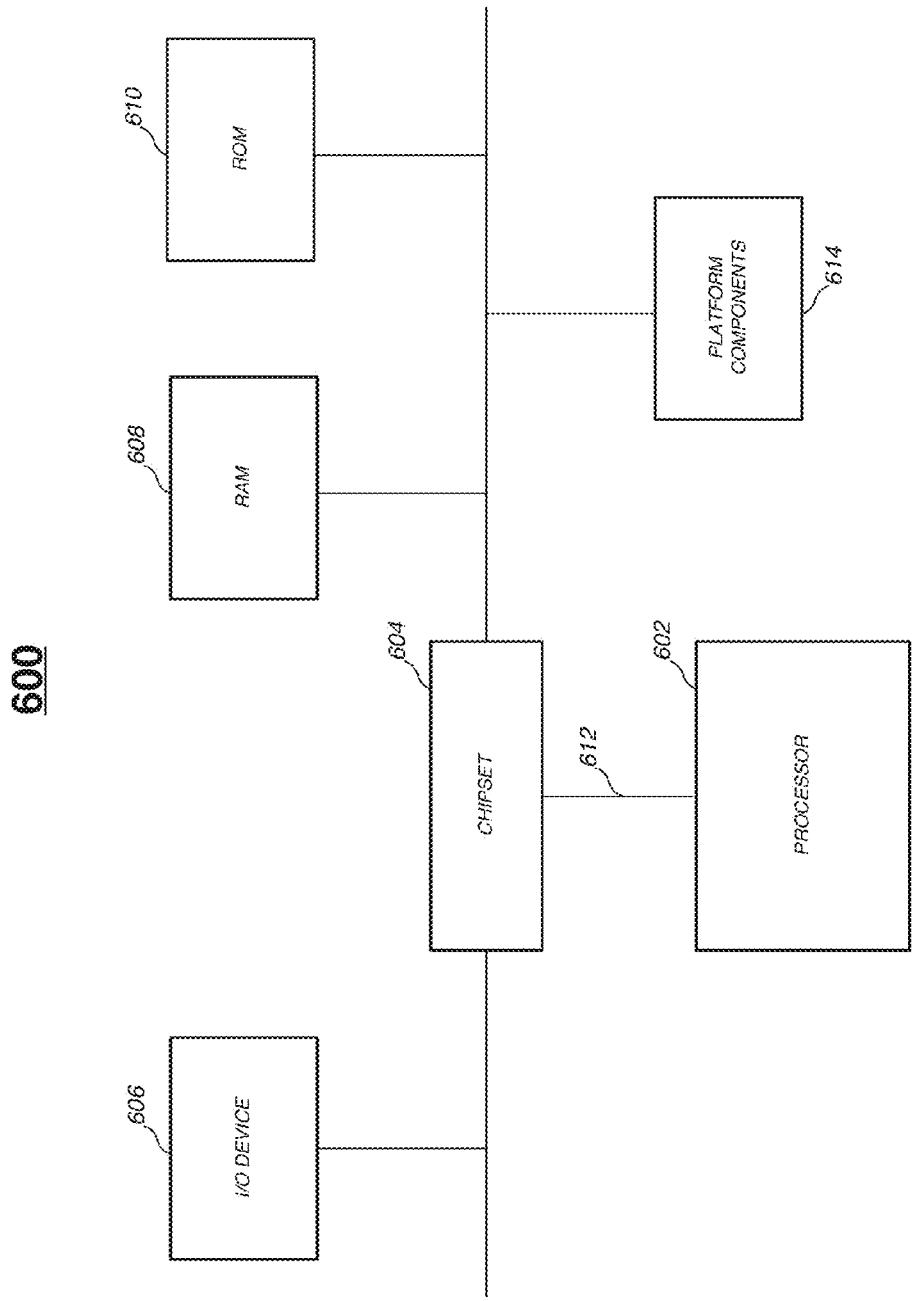
FIG. 6 illustrates one embodiment of a system.

FIG. 6 is a diagram of an exemplary system embodiment. In particular, FIG. 6 is a diagram showing a system 600, which may include various elements. For instance, FIG. 6 shows that system 600 may include a processor 602, a chipset 604, an input/output (I/O) device 606, a random access memory (RAM) (such as dynamic RAM (DRAM)) 608, and a read only memory (ROM) 610, and various platform components 614 (e.g., a fan, a crossflow blower, a heat sink, DTM system, cooling system, housing, vents, and so forth). These elements may be implemented in hardware, software, firmware, or any combination thereof. The embodiments, however, are not limited to these elements.

In particular, the platform components 614 may include a cooling system implementing various VRB techniques. The cooling system may be sized for the system 600, and may include any cooling elements designed to perform heat dissipation, such as heat pipes, heat links, heat transfers, heat spreaders, vents, fans, blowers, crossflow blowers and liquid-based coolants.

As shown in FIG. 6, I/O device 606, RAM 608, and ROM 610 are coupled to processor 602 by way of chipset 604. Chipset 604 may be coupled to processor 602 by a bus 612. Accordingly, bus 612 may include multiple lines.

Processor 602 may be a central processing unit comprising one or more processor cores and may include any number of processors having any number of processor cores. The processor 602 may include any type of processing unit, such as, for example, CPU, multi-processing unit, a reduced instruction set computer (RISC), a processor that have a pipeline, a complex instruction set computer (CISC), digital signal processor (DSP), and so forth.

Although not shown, the system 600 may include various interface circuits, such as an Ethernet interface and/or a Universal Serial Bus (USB) interface, and/or the like. In some exemplary embodiments, the I/O device 606 may comprise one or more input devices connected to interface circuits for entering data and commands into the system 600. For example, the input devices may include a keyboard, mouse, touch screen, track pad, track ball, isopoint, a voice recognition system, and/or the like. Similarly, the I/O device 606 may comprise one or more output devices connected to the interface circuits for outputting information to an operator. For example, the output devices may include one or more displays, printers, speakers, and/or other output devices, if desired. For example, one of the output devices may be a display. The display may be a cathode ray tube (CRTs), liquid crystal displays (LCDs), or any other type of display.

The system 600 may also have a wired or wireless network interface to exchange data with other devices via a connection to a network. The network connection may be any type of network connection, such as an Ethernet connection, digital subscriber line (DSL), telephone line, coaxial cable, etc. The network may be any type of network, such as the Internet, a telephone network, a cable network, a wireless network, a packet-switched network, a circuit-switched network, and/or the like.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Some embodiments may be implemented, for example, using a machine-readable or computer-readable medium or article which may store an instruction, a set of instructions or computer executable code that, if executed by a machine or processor, may cause the machine or processor to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

The detailed disclosure now turns to providing examples that pertain to further embodiments. Examples one through twenty-seven provided below are intended to be exemplary and non-limiting.

In a first example, a blower may comprise a motor, a casing having one or more inlets and one or more outlets, and a cylindrical rotor to create a volumetric resistance inside the casing, at least a portion of the rotor comprising a porous material.

In a second example of a blower, the porous material may comprise one or more of foam, fabric or stamped or cut metal.

In a third example of a blower, the porous material may comprise a plurality of bristles arranged in a random or pseudo-random pattern and coupled to a hub arranged to support the rotor and to couple the rotor to the motor.

In a fourth example of a blower, the bristles may comprise a plastic or metal material having rigidity selected such that the bristles are self-supporting.

In a fifth example of a blower, the rotor may comprise a plurality of blades and the porous material arranged around at least a portion of one or more of the plurality of blades.

In a sixth example of a blower, the plurality of blades may be coupled on a first end to a hub arranged to support the rotor and to couple the rotor to the motor and on a second end to an outer ring of the rotor, the porous material arranged in one or more of a space between one or more of the plurality of blades, a space between the hub and the outer ring and a space between a top side and a bottom side of the outer ring.

In a seventh example of a blower, the rotor may comprise a porous material arranged between a top plate and a bottom plate, the porous material arranged to continuously conform to an available internal height of an enclosure based on changes in an angle of one or more of the top plate or bottom plate based on contact of the top plate or bottom plate with another surface.

In an eighth example of a blower, the porous material may be arranged to accumulate dust, the accumulated dust to increase iso-acoustic performance of the rotor.

In a ninth example of a blower, the rotor may comprise a cylindrical metal disk having a plurality of stamped or cut portions on a flat surface of the disk, one or more of the plurality of stamped or cut portions bent in a random or pseudo-random manner with respect to the flat surface to create an uneven porous surface.

In a tenth example of a blower, the stamped or cut portions may comprise a plurality of different sized hexagonal shaped tabs.

In an eleventh example of a blower, the rotor may comprise a bottom plate comprising a rigid flat plate that is affixed to or that supports the rotor and comprises a randomly or pseudo-randomly pattern of holes with random sizes and random radial locations.

In a twelfth example of a blower, the volumetric resistance may cause a flow of air to be drawn into the one or more inlets and out of the one or more outlets.

In a thirteenth example of a blower, the rotor may be arranged to generate a centrifugal force to cause a flow of air to flow through the porous material.

In a fourteenth example of a blower, the rotor may be arranged to generate low iso-acoustic interference compared to a blade-based rotor.

In a fifteenth example, a computing system may comprise an enclosure, one or more heat generating components and/or heat producing components, and a cylindrical rotor to create a volumetric resistance inside a casing of a blower, at least a portion of the rotor comprising a porous material.

In a sixteenth example of a computing system, the blower may comprise a motor, a hub arranged to support the rotor and to couple the rotor to the motor, and a casing having one or more inlets and one or more outlets, the volumetric resistance to cause a flow of air to be drawn into the one or more inlets and out of the one or more outlets.

In a seventeenth example of a computing system, the porous material may comprise one or more of foam, fabric or stamped or cut metal.

In an eighteenth example of a computing system, the porous material may comprise a plurality of bristles arranged in a random or pseudo-random pattern and coupled to a hub arranged to support the rotor and to couple the rotor to the motor, the bristles comprising a plastic or metal material having rigidity selected such that the bristles are self-supporting.

In a nineteenth example of a computing system, the rotor may comprise a plurality of blades and the porous material arranged around at least a portion of one or more of the plurality of blades.

In a twentieth example of a computing system, the plurality of blades may be coupled on a first end to a hub arranged to support the rotor and to couple the rotor to the motor and on a second end to an outer ring, the porous material arranged in one or more of a space between one or more of the plurality of blades, a space between the hub and the outer ring and a space between a top side and a bottom side of the outer ring.

In a twenty-first example of a computing system, the rotor may comprise a porous material arranged between a top plate and a bottom plate, the porous material arranged to continuously conform to an available internal height of an enclosure based on changes in an angle of one or more of the top plate or bottom plate based on contact of the top plate or bottom plate with another surface.

In a twenty-second example of a computing system, the porous material may be arranged to accumulate dust, the accumulated dust to increase iso-acoustic performance of the rotor.

In a twenty-third example of a computing system, the rotor may comprise a cylindrical metal disk having a plurality of stamped or cut portions on a flat surface of the disk, one or more of the plurality of stamped or cut portions bent in a random or pseudo-random manner with respect to the flat surface to create a porous surface.

In a twenty-fourth example of a computing system, the stamped or cut portions may comprise a plurality of different sized hexagonal shaped tabs.

In a twenty-fifth example of a computing system, the rotor may comprise a bottom plate comprising a rigid flat plate that is affixed to or that supports the rotor and comprises a randomly or pseudo-randomly pattern of holes with random sizes and random radial locations.

In a twenty-sixth example, a method may comprise stamping or cutting a plurality of different sized tabs into a flat sheet metal material, bending, in a plurality of directions and angles with respect to the flat surface, one or more of the plurality of stamped or cut tabs in a random or pseudo-random pattern to create an uneven and porous surface, and stamping or cutting the flat sheet metal material into one or more cylindrical sheet metal discs.

In a twenty-seventh example, a method may comprise arranging the cylindrical sheet metal disc in a blower casing having one or more inlets and one or more outlets, rotation of the cylindrical sheet metal disc to create a volumetric resistance inside the casing to cause a flow of air to be drawn into the one or more inlets and out of the one or more outlets.

Other embodiments and examples are described and claimed.

It is emphasized that the Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter that lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Moreover, the terms "first," "second," and "third," etc. are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A blower, comprising:
   a motor;
   a casing having one or more inlets and one or more outlets; and
   a cylindrical rotor to create a volumetric resistance inside the casing, at least a portion of the rotor comprising a porous material, the rotor comprising a cylindrical metal disk having a plurality of stamped or cut portions on a flat surface of the disk, one or more of the plurality of stamped or cut portions bent in a random or pseudo-random manner with respect to the flat surface to create an uneven porous surface.

2. The blower of claim 1, the porous material comprising one or more of foam, fabric, stamped or cut metal, porous paper, woven materials, screens, or porous plastics.

3. The blower of claim 1, the porous material arranged to accumulate dust, the accumulated dust to increase iso-acoustic performance of the rotor.

4. The blower of claim 1, the stamped or cut portions comprising a plurality of different sized or shaped tabs.

5. The blower of claim 1, the volumetric resistance to cause a flow of air to be drawn into the one or more inlets and out of the one or more outlets.

6. The blower of claim 1, the rotor arranged to generate a centrifugal force to cause a flow of air to flow through the porous material.

7. The blower of claim 1, the rotor arranged to generate low iso-acoustic interference compared to a blade-based rotor.

8. A computing system, comprising:
   an enclosure;
   one or more heat producing components; and
   a cylindrical rotor to create a volumetric resistance inside a casing of a blower, at least a portion of the rotor comprising a porous material, the rotor comprising a cylindrical metal disk having a plurality of stamped or cut portions on a flat surface of the disk, one or more of the plurality of stamped or cut portions bent in a random, pseudo-random or fractal manner with respect to the flat surface to create a porous surface.

9. The computing system of claim 8, the blower comprising:
   a motor;
   a hub arranged to support the rotor and to couple the rotor to the motor; and
   a casing having one or more inlets and one or more outlets, the volumetric resistance to cause a flow of air to be drawn into the one or more inlets and out of the one or more outlets.

10. The computing system of claim 8, the porous material comprising one or more of foam, fabric, stamped or cut metal, porous paper, woven materials, screens, or porous plastics.

11. The computing system of claim 8, the porous material arranged to accumulate dust, the accumulated dust to increase iso-acoustic performance of the rotor.

12. The computing system of claim 8, the stamped or cut portions comprising a plurality of different sized shaped tabs.

13. A method, comprising:
   stamping or cutting a plurality of different sized tabs into a flat sheet metal material;
   bending, in a plurality of directions and angles with respect to the flat surface, one or more of the plurality of stamped or cut tabs in a random or pseudo-random pattern to create an uneven and porous surface; and
   stamping or cutting the flat sheet metal material into one or more cylindrical sheet metal discs.

14. The method of claim 13, comprising:
   arranging the cylindrical sheet metal disc in a blower casing having one or more inlets and one or more outlets, rotation of the cylindrical sheet metal disc to create a volumetric resistance inside the casing to cause a flow of air to be drawn into the one or more inlets and out of the one or more outlets.

* * * * *